United States Patent
Stojkovic et al.

(10) Patent No.: US 12,365,828 B2
(45) Date of Patent: Jul. 22, 2025

(54) POLYOLEFIN-COKE COMPOSITE GRANULES AS A HYDRAULIC FRACTURING PROPPANT

(71) Applicant: ExxonMobil Technology and Engineering Company, Spring, TX (US)

(72) Inventors: Dragan Stojkovic, Spring, TX (US); Robert M. Shirley, The Woodlands, TX (US); Lee J. Hall, The Woodlands, TX (US); Kendal Decker, Spring, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 0 days.

(21) Appl. No.: 18/558,784

(22) PCT Filed: Feb. 23, 2022

(86) PCT No.: PCT/US2022/070776
§ 371 (c)(1),
(2) Date: Nov. 3, 2023

(87) PCT Pub. No.: WO2022/241338
PCT Pub. Date: Nov. 17, 2022

(65) Prior Publication Data
US 2024/0228867 A1    Jul. 11, 2024

Related U.S. Application Data

(60) Provisional application No. 63/186,958, filed on May 11, 2021.

(51) Int. Cl.
*C09K 8/80* (2006.01)
*E21B 43/11* (2006.01)
*E21B 43/267* (2006.01)

(52) U.S. Cl.
CPC ............ *C09K 8/805* (2013.01); *E21B 43/267* (2013.01); *E21B 43/11* (2013.01)

(58) Field of Classification Search
CPC . C09K 8/80; C09K 8/805; C09K 8/64; C09K 8/665; C09K 8/66; E21B 43/267; E21B 43/26; E21B 43/11
See application file for complete search history.

(56) References Cited

U.S. PATENT DOCUMENTS

| | | | |
|---|---|---|---|
| 1,754,765 | A | 4/1930 | Parr et al. |
| 3,089,542 | A | 5/1963 | Kolodny |

(Continued)

FOREIGN PATENT DOCUMENTS

| | | | |
|---|---|---|---|
| CA | 684454 | A | 4/1964 |
| CA | 2863283 | A1 | 3/2015 |

(Continued)

OTHER PUBLICATIONS

International Search Report and Written Opinion, mailed Jun. 13, 2022, Application No. PCT/US2022/070776, 10 pages.

(Continued)

*Primary Examiner* — Zakiya W Bates
(74) *Attorney, Agent, or Firm* — ExxonMobil Technology and Engineering Company—Law Department (57) ABSTRACT

A proppant includes polyolefin-coke composite granules, and a hydrocarbon well uses such proppant. Methods employ the proppant in a hydrocarbon well. The hydrocarbon well includes a wellbore that extends within a subsurface region and a downhole tubular that extends within the wellbore and defines a tubular conduit. The hydrocarbon well also includes a number of perforations formed within the downhole tubular and a number of fractures formed within the subsurface region proximate to the perforations. The hydrocarbon well further includes the proppant posi- (Continued)

tioned within at least a portion of the fractures. The proppant includes a number of polyolefin-coke composite granules, where a characteristic dimension of each polyolefin-coke composite granule is at least 50 micrometers (μm) and at most 3 millimeters (mm), and where each polyolefin-coke composite granule includes a number of polyolefin polymer chains and at least one petroleum coke granule.

20 Claims, 2 Drawing Sheets

(56) References Cited

U.S. PATENT DOCUMENTS

| | | | |
|---|---|---|---|
| 3,283,817 A | 11/1966 | Roberts |
| 3,659,651 A | 5/1972 | Graham |
| 3,661,543 A | 5/1972 | Saxton |
| 3,664,420 A | 5/1972 | Graham et al. |
| 3,700,032 A | 10/1972 | Terry et al. |
| 3,702,516 A | 11/1972 | Luckenbach |
| 3,707,462 A | 12/1972 | Moss |
| 3,759,676 A | 9/1973 | Lahn |
| 3,816,084 A | 6/1974 | Moser et al. |
| 4,036,750 A | 7/1977 | Jaros et al. |
| 4,213,848 A | 7/1980 | Saxton |
| 4,269,696 A | 5/1981 | Metrailer |
| 4,741,840 A | 5/1988 | Atherton et al. |
| 4,796,701 A | 1/1989 | Hudson et al. |
| 4,957,174 A | 9/1990 | Whitfill et al. |
| 5,189,102 A | 2/1993 | Tsubuko et al. |
| 5,215,143 A | 6/1993 | Gentry |
| 5,472,596 A | 12/1995 | Kerby et al. |
| 5,604,184 A | 2/1997 | Ellis et al. |
| 5,889,137 A | 3/1999 | Hutchings et al. |
| 5,899,272 A | 5/1999 | Loree |
| 6,016,879 A | 1/2000 | Burts, Jr. |
| 6,035,936 A | 3/2000 | Whalen |
| 6,059,034 A | 5/2000 | Rickards et al. |
| 6,283,212 B1 | 9/2001 | Hinkel et al. |
| 6,330,916 B1 | 12/2001 | Rickards et al. |
| 6,720,290 B2 | 4/2004 | England et al. |
| 6,825,152 B2 | 11/2004 | Green |
| 7,073,581 B2 | 7/2006 | Nguyen et al. |
| 7,210,528 B1 | 5/2007 | Brannon et al. |
| 7,237,609 B2 | 7/2007 | Nguyen |
| 7,249,500 B2 | 7/2007 | Dutton et al. |
| 7,255,169 B2 | 8/2007 | van Batenburg et al. |
| 7,270,879 B2 | 9/2007 | McCrary |
| 7,325,608 B2 | 2/2008 | van Batenburg et al. |
| 7,334,635 B2 | 2/2008 | Nguyen |
| 7,337,839 B2 | 3/2008 | Ayoub et al. |
| 7,424,911 B2 | 9/2008 | McCarthy et al. |
| 7,450,053 B2 | 11/2008 | Funk et al. |
| 7,472,751 B2 | 1/2009 | Brannon et al. |
| 7,494,711 B2 | 2/2009 | Kaufman et al. |
| 7,521,389 B2 | 4/2009 | Shmotev et al. |
| 7,527,097 B2 | 5/2009 | Patel |
| 7,528,096 B2 | 5/2009 | Brannon et al. |
| 7,541,318 B2 | 6/2009 | Weaver et al. |
| 7,568,524 B2 | 8/2009 | Blackburn et al. |
| 7,598,898 B1 | 10/2009 | Funk et al. |
| 7,612,021 B2 | 11/2009 | Chatterji et al. |
| 7,648,934 B2 | 1/2010 | Shmotev et al. |
| 7,669,657 B2 | 3/2010 | Symington et al. |
| 7,699,106 B2 | 4/2010 | Brannon et al. |
| 7,703,531 B2 | 4/2010 | Huang et al. |
| 7,721,803 B2 | 5/2010 | Huang et al. |
| 7,726,399 B2 | 6/2010 | Brannon et al. |
| 7,727,940 B2 | 6/2010 | Reddy et al. |
| 7,735,556 B2 | 6/2010 | Misselbrook et al. |
| 7,772,163 B1 | 8/2010 | Brannon et al. |
| 7,789,147 B2 | 9/2010 | Brannon et al. |
| 7,790,656 B2 | 9/2010 | Windebank et al. |
| 7,825,053 B2 | 11/2010 | Duenckel et al. |
| 7,833,947 B1 | 11/2010 | Kubala |
| 7,841,411 B2 | 11/2010 | Fuller et al. |
| 7,900,702 B2 | 3/2011 | Reddy et al. |
| 7,918,277 B2 | 4/2011 | Brannon et al. |
| 7,954,548 B2 | 6/2011 | Curimbaba et al. |
| 7,971,644 B2 | 7/2011 | Ladva et al. |
| 8,003,214 B2 | 8/2011 | Rediger et al. |
| 8,006,755 B2 | 8/2011 | Bicerano |
| 8,058,213 B2 | 11/2011 | Rediger et al. |
| 8,061,427 B2 | 11/2011 | Jackson et al. |
| 8,063,000 B2 | 11/2011 | Wilson |
| 8,082,994 B2 | 12/2011 | Nguyen et al. |
| 8,091,637 B2 | 1/2012 | Fripp |
| 8,104,537 B2 | 1/2012 | Kaminsky |
| 8,113,283 B2 | 2/2012 | Welton et al. |
| 8,127,844 B2 | 3/2012 | Luharuka et al. |
| 8,127,849 B2 | 3/2012 | Gupta |
| 8,127,850 B2 | 3/2012 | Brannon et al. |
| 8,167,043 B2 | 5/2012 | Willberg et al. |
| 8,178,477 B2 | 5/2012 | Skala et al. |
| 8,227,026 B2 | 7/2012 | McDaniel et al. |
| 8,236,737 B2 | 8/2012 | Fan et al. |
| 8,240,383 B2 | 8/2012 | Xu et al. |
| 8,281,857 B2 | 10/2012 | Willberg et al. |
| 8,291,978 B2 | 10/2012 | Hutchins et al. |
| 8,327,940 B2 | 12/2012 | Boronin et al. |
| 8,354,939 B2 | 1/2013 | McDaniel et al. |
| 8,360,149 B2 | 1/2013 | Hughes et al. |
| 8,361,373 B1 | 1/2013 | Byron |
| 8,420,578 B2 | 4/2013 | Usova et al. |
| 8,459,353 B2 | 6/2013 | Hughes et al. |
| 8,496,057 B2 | 7/2013 | Ferrero et al. |
| 8,540,024 B2 | 9/2013 | Kosarev et al. |
| 8,584,755 B2 | 11/2013 | Willberg et al. |
| 8,596,355 B2 | 12/2013 | Kaminsky et al. |
| 8,596,361 B2 | 12/2013 | Willberg et al. |
| 8,596,362 B2 | 12/2013 | Nelson |
| 8,603,578 B2 | 12/2013 | Smith et al. |
| 8,607,870 B2 | 12/2013 | Gu et al. |
| 8,613,314 B2 | 12/2013 | Garcia-Lopez de Victoria et al. |
| 8,614,157 B2 | 12/2013 | Pope et al. |
| 8,701,774 B2 | 4/2014 | Johnson, Sr. |
| 8,739,878 B2 | 6/2014 | Brannon et al. |
| 8,770,294 B2 | 7/2014 | Tanguay et al. |
| 8,772,207 B2 | 7/2014 | Geary et al. |
| 8,869,888 B2 | 10/2014 | Cramer et al. |
| 8,931,553 B2 | 1/2015 | Cannan et al. |
| 8,936,083 B2 | 1/2015 | Nguyen |
| 8,944,164 B2 | 2/2015 | Veldman et al. |
| 8,959,954 B2 | 2/2015 | Koseski et al. |
| 8,960,284 B2 | 2/2015 | Nguyen et al. |
| 8,978,764 B2 | 3/2015 | Dusseault et al. |
| 8,993,489 B2 | 3/2015 | McDaniel et al. |
| 9,010,424 B2 | 4/2015 | Agrawal et al. |
| 9,023,770 B2 | 5/2015 | Todd et al. |
| 9,080,441 B2 | 7/2015 | Meurer et al. |
| 9,091,161 B2 | 7/2015 | Brannon |
| 9,096,790 B2 | 8/2015 | McCrary et al. |
| 9,097,097 B2 | 8/2015 | DiFoggio et al. |
| 9,102,867 B2 | 8/2015 | Parse et al. |
| 9,109,992 B2 | 8/2015 | Wang |
| 9,140,118 B2 | 9/2015 | Kulkarni et al. |
| 9,145,513 B2 | 9/2015 | Pershikova et al. |
| 9,175,210 B2 | 11/2015 | Eldred et al. |
| 9,175,529 B2 | 11/2015 | Jamison et al. |
| 9,228,041 B2 | 1/2016 | Martinez-Castro et al. |
| 9,234,127 B2 | 1/2016 | De Paiva Cortes et al. |
| 9,234,415 B2 | 1/2016 | Hughes et al. |
| 9,243,491 B2 | 1/2016 | McDaniel et al. |
| 9,290,689 B2 | 3/2016 | Lafitte et al. |
| 9,291,045 B2 | 3/2016 | Wheeler et al. |
| 9,315,719 B2 | 4/2016 | Fang et al. |
| 9,322,269 B2 | 4/2016 | Matherly et al. |
| 9,353,613 B2 | 5/2016 | Soliman et al. |
| 9,388,334 B2 | 7/2016 | Hughes et al. |
| 9,458,710 B2 | 10/2016 | Makarychev-Mikhailov et al. |
| 9,523,268 B2 | 12/2016 | Potapenko et al. |
| 9,556,376 B2 | 1/2017 | Huang et al. |
| 9,574,130 B2 | 2/2017 | Gupta |
| 9,611,423 B2 | 4/2017 | Zhang et al. |

(56) References Cited

U.S. PATENT DOCUMENTS

| | | |
|---|---|---|
| 9,631,137 B2 | 4/2017 | Fuss et al. |
| 9,638,016 B2 | 5/2017 | Horvath Szabo et al. |
| 9,643,774 B2 | 5/2017 | Oren |
| 9,650,881 B2 | 5/2017 | Clem |
| 9,657,219 B2 | 5/2017 | Rodriguez |
| 9,670,400 B2 | 6/2017 | Eldred et al. |
| 9,670,762 B2 | 6/2017 | Nguyen et al. |
| 9,670,763 B2 | 6/2017 | Fang et al. |
| 9,670,764 B2 | 6/2017 | Lesko et al. |
| 9,688,905 B2 | 6/2017 | Nguyen et al. |
| 9,701,589 B2 | 7/2017 | Schofalvi |
| 9,715,026 B2 | 7/2017 | Ejofodomi et al. |
| 9,719,011 B2 | 8/2017 | Tanguay et al. |
| 9,732,269 B2 | 8/2017 | Bicerano |
| 9,732,561 B2 | 8/2017 | Carter, Jr. |
| 9,739,122 B2 | 8/2017 | Symington et al. |
| 9,745,841 B2 | 8/2017 | Marino et al. |
| 9,783,727 B2 | 10/2017 | Lahman et al. |
| 9,790,422 B2 | 10/2017 | McDaniel |
| 9,803,135 B2 | 10/2017 | Barron et al. |
| 9,816,364 B2 | 11/2017 | Kruspe et al. |
| 9,845,427 B2 | 12/2017 | Soane et al. |
| 9,845,428 B2 | 12/2017 | Soane et al. |
| 9,850,748 B2 | 12/2017 | Nguyen et al. |
| 9,862,879 B2 | 1/2018 | Chatterjee et al. |
| 9,879,175 B2 | 1/2018 | Aines et al. |
| 9,896,618 B2 | 2/2018 | Huang et al. |
| 9,896,619 B2 | 2/2018 | Nguyen et al. |
| 9,902,899 B2 | 2/2018 | Parse et al. |
| 9,914,872 B2 | 3/2018 | Wehunt et al. |
| 9,920,607 B2 | 3/2018 | Brannon et al. |
| 9,920,610 B2 | 3/2018 | Nelson et al. |
| 9,932,521 B2 | 4/2018 | Soane et al. |
| 9,938,454 B2 | 4/2018 | Tanguay et al. |
| 9,938,811 B2 | 4/2018 | Bestaoui-Spurr et al. |
| 9,944,845 B2 | 4/2018 | Tanguay et al. |
| 9,957,440 B2 | 5/2018 | Nguyen et al. |
| 9,995,125 B2 | 6/2018 | Madasu et al. |
| 10,001,003 B2 | 6/2018 | Dusseault et al. |
| 10,001,769 B2 | 6/2018 | Huang et al. |
| 10,011,763 B2 | 7/2018 | Hartman et al. |
| 10,017,688 B1 | 7/2018 | Green et al. |
| 10,023,791 B1 | 7/2018 | Corcoran et al. |
| 10,060,244 B2 | 8/2018 | Nguyen et al. |
| 10,081,758 B2 | 9/2018 | Dreyer et al. |
| 10,082,013 B2 | 9/2018 | Nguyen et al. |
| 10,087,735 B2 | 10/2018 | Brannon |
| 10,093,849 B2 | 10/2018 | Windebank et al. |
| 10,106,728 B2 | 10/2018 | Dusterhoft et al. |
| 10,106,732 B2 | 10/2018 | Cannan et al. |
| 10,113,106 B2 | 10/2018 | Wadekar |
| 10,113,406 B1 | 10/2018 | Gomaa et al. |
| 10,138,415 B2 | 11/2018 | Bryant et al. |
| 10,150,907 B2 | 12/2018 | Weaver et al. |
| 10,202,836 B2 | 2/2019 | Veldman et al. |
| 10,208,243 B2 | 2/2019 | Burks et al. |
| 10,214,682 B2 | 2/2019 | Nguyen et al. |
| 10,221,660 B2 | 3/2019 | Moeller et al. |
| 10,227,525 B2 | 3/2019 | Monroe et al. |
| 10,233,386 B2 | 3/2019 | Chatterjee et al. |
| 10,240,447 B2 | 3/2019 | Gupta et al. |
| 10,253,250 B2 | 4/2019 | Nguyen et al. |
| 10,266,758 B2 | 4/2019 | Rediger |
| 10,267,133 B2 | 4/2019 | Gullickson et al. |
| 10,267,134 B2 | 4/2019 | Cannan et al. |
| 10,280,363 B2 | 5/2019 | Suzart et al. |
| 10,287,482 B2 | 5/2019 | Ferm et al. |
| 10,287,867 B2 | 5/2019 | Nguyen et al. |
| 10,301,920 B2 | 5/2019 | Green et al. |
| 10,352,145 B2 | 7/2019 | Maxwell et al. |
| 10,364,660 B2 | 7/2019 | Nguyen et al. |
| 10,369,724 B2 | 8/2019 | Ortega Andrade et al. |
| 10,370,586 B2 | 8/2019 | Fitzgerald et al. |
| 10,370,950 B2 | 8/2019 | Gupta et al. |
| 10,400,054 B2 | 9/2019 | Viswanath et al. |
| 10,421,897 B2 | 9/2019 | Skiba et al. |
| 10,428,266 B2 | 10/2019 | Nguyen et al. |
| 10,428,267 B2 | 10/2019 | Cannan et al. |
| 10,457,855 B2 | 10/2019 | Mahmoud et al. |
| 10,457,859 B2 | 10/2019 | Robl et al. |
| 10,458,220 B2 | 10/2019 | Switzer et al. |
| 10,479,704 B2 | 11/2019 | Hayes et al. |
| 10,479,929 B2 | 11/2019 | Gupta |
| 10,519,361 B2 | 12/2019 | Wadekar et al. |
| 10,519,364 B2 | 12/2019 | Stephens et al. |
| 10,538,696 B2 | 1/2020 | Allen et al. |
| 10,538,697 B2 | 1/2020 | Nguyen et al. |
| 10,557,335 B2 | 2/2020 | Potapenko et al. |
| 10,590,265 B2 | 3/2020 | Yalcin et al. |
| 10,590,324 B2 | 3/2020 | Kulkarni et al. |
| 10,590,763 B2 | 3/2020 | Sen et al. |
| 10,611,954 B2 | 4/2020 | Ramos et al. |
| 10,640,388 B2 | 5/2020 | Akbar et al. |
| 10,640,701 B2 | 5/2020 | Montalvo et al. |
| 10,647,907 B2 | 5/2020 | Nguyen et al. |
| 10,647,908 B2 | 5/2020 | Favero |
| 10,647,910 B1 | 5/2020 | Nguyen et al. |
| 10,655,408 B2 | 5/2020 | Goloshchapova |
| 10,655,443 B2 | 5/2020 | Gomaa et al. |
| 10,655,444 B2 | 5/2020 | Nguyen et al. |
| 10,655,466 B2 | 5/2020 | Kabannik |
| 10,661,981 B2 | 5/2020 | Oren et al. |
| 10,689,972 B1 | 6/2020 | Zhao et al. |
| 10,711,564 B2 | 7/2020 | Dusterhoft et al. |
| 10,723,938 B2 | 7/2020 | Johnson, Sr. |
| 10,738,581 B2 | 8/2020 | Nguyen et al. |
| 10,738,582 B2 | 8/2020 | Nguyen et al. |
| 10,738,584 B2 | 8/2020 | Nguyen et al. |
| 10,745,611 B2 | 8/2020 | Nguyen et al. |
| 10,752,828 B2 | 8/2020 | Gomaa et al. |
| 10,767,101 B2 | 9/2020 | Kovalchuk et al. |
| 10,767,104 B2 | 9/2020 | Do et al. |
| 10,793,768 B2 | 10/2020 | Patel et al. |
| 10,801,307 B2 | 10/2020 | Roussel et al. |
| 10,808,167 B2 | 10/2020 | Beuterbaugh et al. |
| 10,808,168 B2 | 10/2020 | Montenegro Galindo et al. |
| 10,808,497 B2 | 10/2020 | Potapenko et al. |
| 10,808,515 B1 | 10/2020 | Sierra et al. |
| 10,815,420 B2 | 10/2020 | Shroff Rama et al. |
| 10,823,646 B1 | 11/2020 | Guo et al. |
| 10,844,280 B2 | 11/2020 | Goyal et al. |
| 10,851,283 B2 | 12/2020 | Potapenko et al. |
| 10,870,792 B2 | 12/2020 | López Reyes et al. |
| 10,876,044 B2 | 12/2020 | Salla et al. |
| 10,882,751 B2 | 1/2021 | Shahsavari et al. |
| 10,900,339 B2 | 1/2021 | Schipper et al. |
| 10,914,139 B2 | 2/2021 | Shahri et al. |
| 10,920,130 B2 | 2/2021 | Nguyen et al. |
| 10,920,558 B2 | 2/2021 | Nguyen et al. |
| 10,934,476 B1 | 3/2021 | Kamavaram et al. |
| 10,941,336 B2 | 3/2021 | Pantsurkin et al. |
| 10,947,447 B2 | 3/2021 | Hendrickson et al. |
| 10,954,430 B2 | 3/2021 | Plishka et al. |
| 10,954,431 B2 | 3/2021 | Chittattukara et al. |
| 10,954,768 B2 | 3/2021 | Gullickson et al. |
| 10,961,444 B1 | 3/2021 | Bestaoui-Spurr et al. |
| 10,975,295 B2 | 4/2021 | Cannan et al. |
| 10,984,156 B2 | 4/2021 | Wu et al. |
| 10,988,674 B2 | 4/2021 | Nguyen et al. |
| 10,988,679 B2 | 4/2021 | Calvin |
| 10,989,034 B2 | 4/2021 | Lin et al. |
| 11,008,506 B2 | 5/2021 | Nguyen et al. |
| 11,008,845 B2 | 5/2021 | Singh et al. |
| 11,014,810 B1 | 5/2021 | De Wit et al. |
| 11,015,437 B2 | 5/2021 | Zhang et al. |
| 11,021,649 B2 | 6/2021 | Bai et al. |
| 11,028,318 B2 | 6/2021 | Cannan et al. |
| 11,078,409 B2 | 8/2021 | Allison |
| 11,104,841 B2 | 8/2021 | Hill et al. |
| 11,111,766 B2 | 9/2021 | Brannon et al. |
| 11,124,696 B2 | 9/2021 | Khamatnurova et al. |
| 11,125,068 B2 | 9/2021 | Jiang et al. |
| 11,142,680 B2 | 10/2021 | Dreyer et al. |
| 11,155,751 B2 | 10/2021 | Bestaoui-Spurr et al. |

(56) References Cited

U.S. PATENT DOCUMENTS

| | | |
|---|---|---|
| 11,162,022 B2 | 11/2021 | Cannan et al. |
| 11,162,347 B2 | 11/2021 | Yu et al. |
| 11,180,691 B2 | 11/2021 | Sodhi et al. |
| 11,230,660 B2 | 1/2022 | Nguyen et al. |
| 11,236,599 B2 | 2/2022 | Nguyen et al. |
| 11,254,857 B2 | 2/2022 | Cox et al. |
| 11,255,176 B2 | 2/2022 | Nguyen et al. |
| 11,274,243 B2 | 3/2022 | Siddiqui et al. |
| 11,280,172 B2 | 3/2022 | Peng et al. |
| 11,313,211 B2 | 4/2022 | Johnson |
| 11,313,214 B2 | 4/2022 | Nguyen et al. |
| 11,319,482 B2 | 5/2022 | Rahy et al. |
| 11,326,088 B2 | 5/2022 | Todd |
| 11,339,323 B2 | 5/2022 | Roper et al. |
| 11,345,848 B2 | 5/2022 | Khamatnurova et al. |
| 11,352,551 B2 | 6/2022 | Agrawal et al. |
| 11,365,341 B2 | 6/2022 | Patil et al. |
| 11,377,581 B2 | 7/2022 | Belakshe et al. |
| 11,377,944 B2 | 7/2022 | Santra et al. |
| 11,396,800 B2 | 7/2022 | Madasu et al. |
| 11,407,932 B2 | 8/2022 | Deysarkar et al. |
| 11,408,281 B2 | 8/2022 | Lu et al. |
| 11,414,974 B2 | 8/2022 | Entchev et al. |
| 11,427,753 B2 | 8/2022 | Ortega Andrade et al. |
| 11,428,087 B2 | 8/2022 | Nguyen et al. |
| 11,428,839 B2 | 8/2022 | Mukherjee |
| 11,434,740 B1 | 9/2022 | Nguyen et al. |
| 11,441,406 B2 | 9/2022 | Nguyen et al. |
| 11,447,690 B2 | 9/2022 | Nguyen et al. |
| 11,447,693 B2 | 9/2022 | Jenkins et al. |
| 11,459,500 B2 | 10/2022 | Khamatnurova et al. |
| 11,466,201 B2 | 10/2022 | Smith, Jr. et al. |
| 11,485,901 B2 | 11/2022 | Shen et al. |
| 11,486,241 B2 | 11/2022 | Nelson et al. |
| 11,492,543 B2 | 11/2022 | Gordon et al. |
| 11,506,584 B2 | 11/2022 | Martysevich et al. |
| 11,512,025 B2 | 11/2022 | Eldred et al. |
| 11,535,588 B2 | 12/2022 | Favero et al. |
| 11,536,125 B1 | 12/2022 | Yang et al. |
| 11,560,776 B2 | 1/2023 | Madasu |
| 11,566,488 B2 | 1/2023 | Brandl et al. |
| 11,566,504 B2 | 1/2023 | Perez et al. |
| 11,568,111 B2 | 1/2023 | Zhou et al. |
| 11,578,262 B2 | 2/2023 | Gordon et al. |
| 11,590,469 B2 | 2/2023 | Cho et al. |
| 11,591,903 B2 | 2/2023 | Mukherjee |
| 11,597,872 B2 | 3/2023 | Conkle |
| 11,608,724 B2 | 3/2023 | Chopade et al. |
| 11,608,740 B2 | 3/2023 | Moos et al. |
| 11,613,691 B1 | 3/2023 | Pollock |
| 11,613,989 B2 | 3/2023 | Zhang et al. |
| 11,629,284 B1 | 4/2023 | Saini et al. |
| 11,629,581 B2 | 4/2023 | Cook |
| 11,643,592 B1 | 5/2023 | Saini et al. |
| 11,649,398 B1 | 5/2023 | AlTammar et al. |
| 11,656,002 B2 | 5/2023 | Nevison et al. |
| 11,661,842 B2 | 5/2023 | Dalamarinis et al. |
| 11,667,831 B2 | 6/2023 | Liang et al. |
| 11,667,832 B2 | 6/2023 | Saini et al. |
| 11,674,074 B2 | 6/2023 | Sherman |
| 11,692,127 B2 | 7/2023 | Dawson et al. |
| 11,692,424 B2 | 7/2023 | Nguyen et al. |
| 11,697,759 B1 | 7/2023 | Dusterhoft et al. |
| 11,697,760 B2 | 7/2023 | Stover et al. |
| 11,702,587 B2 | 7/2023 | Li et al. |
| 11,702,588 B1 | 7/2023 | Saini et al. |
| 11,713,414 B1 | 8/2023 | Dobson et al. |
| 11,732,179 B2 | 8/2023 | Vidma et al. |
| 11,753,584 B2 | 9/2023 | Mazrooee et al. |
| 11,753,919 B2 | 9/2023 | Velikanov et al. |
| 11,753,923 B2 | 9/2023 | Dalamarinis |
| 11,767,466 B2 | 9/2023 | Santra et al. |
| 11,781,062 B1 | 10/2023 | Liu et al. |
| 11,781,412 B2 | 10/2023 | Zhang et al. |
| 11,814,923 B2 | 11/2023 | Sherman et al. |
| 11,827,845 B2 | 11/2023 | Vigderman et al. |
| 11,840,911 B2 | 12/2023 | Fan et al. |
| 11,845,895 B2 | 12/2023 | Montalvo et al. |
| 11,859,129 B2 | 1/2024 | Uddenburg et al. |
| 11,859,489 B2 | 1/2024 | Werry et al. |
| 11,876,398 B1 | 1/2024 | Heath et al. |
| 11,965,677 B2 | 4/2024 | Cook et al. |
| 12,037,894 B2 | 7/2024 | Zhang et al. |
| 2001/0001308 A1 | 5/2001 | Varadaraj et al. |
| 2004/0014824 A1 | 1/2004 | Leinweber et al. |
| 2004/0040708 A1 | 3/2004 | Stephenson et al. |
| 2005/0244641 A1 | 11/2005 | Vincent |
| 2005/0274523 A1 | 12/2005 | Brannon et al. |
| 2006/0073980 A1 | 4/2006 | Brannon et al. |
| 2006/0175059 A1 | 8/2006 | Sinclair et al. |
| 2006/0272816 A1 | 12/2006 | Willberg et al. |
| 2008/0135246 A1 | 6/2008 | Canova et al. |
| 2008/0156489 A1 | 7/2008 | Pershikova et al. |
| 2009/0038797 A1* | 2/2009 | Skala ............... C09K 8/80 507/239 |
| 2009/0038799 A1 | 2/2009 | Garcia-Lopez de Victoria et al. |
| 2009/0075847 A1 | 3/2009 | Wawrzos et al. |
| 2009/0283447 A1 | 11/2009 | D'Elia et al. |
| 2010/0179077 A1 | 7/2010 | Turakhia et al. |
| 2010/0263865 A1 | 10/2010 | Willberg et al. |
| 2011/0082033 A1 | 4/2011 | Frohs et al. |
| 2011/0111990 A1 | 5/2011 | Pershikova et al. |
| 2011/0118155 A1 | 5/2011 | Pisklak et al. |
| 2012/0043080 A1 | 2/2012 | Edwards |
| 2012/0088699 A1 | 4/2012 | Qin |
| 2012/0241168 A1 | 9/2012 | Pei et al. |
| 2012/0267102 A1 | 10/2012 | Huang et al. |
| 2012/0292031 A1* | 11/2012 | Nelson ............... E21B 43/26 166/308.1 |
| 2013/0025867 A1 | 1/2013 | Sun et al. |
| 2014/0014338 A1 | 1/2014 | Crews et al. |
| 2014/0096952 A1 | 4/2014 | Hocking |
| 2014/0196898 A1 | 7/2014 | Tanguay et al. |
| 2014/0209390 A1 | 7/2014 | Jamison et al. |
| 2014/0353042 A1 | 12/2014 | Karale et al. |
| 2015/0167437 A1 | 6/2015 | Dawson |
| 2015/0233226 A1 | 8/2015 | Holzhauser et al. |
| 2015/0247084 A1 | 9/2015 | Epstein |
| 2015/0292279 A1 | 10/2015 | Wang |
| 2015/0361331 A1 | 12/2015 | Tanguay et al. |
| 2016/0137910 A1 | 5/2016 | Chang et al. |
| 2016/0215205 A1 | 7/2016 | Nguyen et al. |
| 2016/0312126 A1 | 10/2016 | Wormsbecker et al. |
| 2016/0319185 A1 | 11/2016 | Semenov et al. |
| 2016/0326300 A1 | 11/2016 | Gelves et al. |
| 2016/0340573 A1 | 11/2016 | Semenov et al. |
| 2017/0145302 A1 | 5/2017 | Qin et al. |
| 2017/0198209 A1 | 7/2017 | Stephenson et al. |
| 2017/0321105 A1 | 11/2017 | McDaniel et al. |
| 2018/0066179 A1 | 3/2018 | Nguyen et al. |
| 2018/0282222 A1 | 10/2018 | Khan |
| 2018/0339946 A1 | 11/2018 | Öttinger et al. |
| 2019/0016944 A1 | 1/2019 | Eldred et al. |
| 2019/0048146 A1 | 2/2019 | Dei Santi et al. |
| 2019/0241789 A1 | 8/2019 | Agapiou et al. |
| 2019/0330520 A1 | 10/2019 | Cannan et al. |
| 2020/0131431 A1 | 4/2020 | Russum |
| 2020/0157415 A1 | 5/2020 | Quintero et al. |
| 2020/0208047 A1 | 7/2020 | Gordon et al. |
| 2020/0306710 A1 | 10/2020 | Cho et al. |
| 2020/0370405 A1 | 11/2020 | Nguyen et al. |
| 2021/0002994 A1 | 1/2021 | Zhou et al. |
| 2021/0087459 A1 | 3/2021 | Patil et al. |
| 2021/0131261 A1 | 5/2021 | Wang et al. |
| 2021/0207465 A1 | 7/2021 | Nguyen et al. |
| 2021/0229049 A1 | 7/2021 | Mazrooee et al. |
| 2021/0246364 A1 | 8/2021 | Gordon et al. |
| 2021/0253943 A1 | 8/2021 | Ghosh et al. |
| 2021/0253944 A1 | 8/2021 | Gordon et al. |
| 2021/0317733 A1 | 10/2021 | Downey |
| 2021/0340432 A1 | 11/2021 | Bhaduri et al. |
| 2022/0090475 A1 | 3/2022 | Radwan |
| 2022/0112422 A1 | 4/2022 | Liang et al. |
| 2022/0169915 A1 | 6/2022 | Barron et al. |

(56) References Cited

U.S. PATENT DOCUMENTS

| | | |
|---|---|---|
| 2022/0186605 A1 | 6/2022 | Quan et al. |
| 2022/0340809 A1 | 10/2022 | Li et al. |
| 2022/0349801 A1 | 11/2022 | Al-Boghail et al. |
| 2023/0085175 A1 | 3/2023 | Smalls et al. |
| 2023/0119075 A1 | 4/2023 | Hall et al. |
| 2023/0123954 A1 | 4/2023 | Maity et al. |
| 2023/0132325 A1 | 4/2023 | Gordon et al. |
| 2023/0134440 A1 | 5/2023 | Decker |
| 2023/0147476 A1 | 5/2023 | Wheelock et al. |
| 2023/0167354 A1 | 6/2023 | Stojkovic et al. |
| 2023/0174848 A1 | 6/2023 | Uddenburg et al. |
| 2023/0175377 A1 | 6/2023 | Nedwed et al. |
| 2023/0183561 A1 | 6/2023 | Carroll et al. |
| 2023/0203362 A1 | 6/2023 | Calvin |
| 2023/0229830 A1 | 7/2023 | Zhao et al. |
| 2023/0257646 A1 | 8/2023 | Robl et al. |
| 2023/0279285 A1 | 9/2023 | Shirley |
| 2023/0279286 A1 | 9/2023 | Gordon |
| 2023/0303911 A1 | 9/2023 | Radwan |
| 2023/0334199 A1 | 10/2023 | Lu et al. |
| 2024/0110471 A1 | 4/2024 | Zhang et al. |
| 2024/0228866 A1 | 7/2024 | Shirley et al. |

FOREIGN PATENT DOCUMENTS

| | | |
|---|---|---|
| CN | 203319922 U | 12/2013 |
| CN | 109236262 A | 8/2020 |
| PL | 234113 B1 | 3/2018 |
| PL | 234114 B1 | 11/2018 |
| WO | 2007141519 A2 | 12/2007 |
| WO | 2008033225 A2 | 3/2008 |
| WO | 2011163529 A1 | 12/2011 |
| WO | 2012040025 A2 | 3/2012 |
| WO | 2012051026 A2 | 4/2012 |
| WO | 2012104582 A1 | 8/2012 |
| WO | 2013059793 A2 | 4/2013 |
| WO | 2013119507 A1 | 8/2013 |
| WO | 2013158308 A1 | 10/2013 |
| WO | 2013176977 A1 | 11/2013 |
| WO | 2014039968 A1 | 3/2014 |
| WO | 2014172953 A1 | 10/2014 |
| WO | 2014172955 A1 | 10/2014 |
| WO | 2015021523 A1 | 2/2015 |
| WO | 2015031415 A2 | 3/2015 |
| WO | 2015041690 A1 | 3/2015 |
| WO | 2016033533 A1 | 3/2016 |
| WO | 2016054022 A1 | 4/2016 |
| WO | 2016074075 A1 | 5/2016 |
| WO | 2016168719 A1 | 10/2016 |
| WO | 2018001748 A1 | 1/2018 |
| WO | 2018094123 A1 | 5/2018 |
| WO | 2019164694 A1 | 8/2019 |
| WO | 2019199431 A1 | 10/2019 |
| WO | 2019/222034 A1 | 11/2019 |
| WO | 2020139472 A1 | 7/2020 |
| WO | 2020185373 A1 | 9/2020 |
| WO | 2021030287 A1 | 2/2021 |
| WO | 2022232715 A1 | 11/2022 |
| WO | 2022241338 A1 | 11/2022 |
| WO | 2022241339 A1 | 11/2022 |
| WO | 2023040535 A1 | 3/2023 |
| WO | 2024131192 A1 | 6/2024 |

OTHER PUBLICATIONS

Edward Furimsky, "Characterization of cokes from fluid/flexi-coking of heavy feeds", Fuel Processing Technology, vol. 67, No. 3, 205-230, XP055559715, Sep. 1, 2000. Abstract.

A. Abrams, "Mud Design to Minimize Rock Impairment Due to Particle Invasion", J Pet Technol 29 (05): 586-592, May 1, 1977.

Alvarez et al., "Wettability Alteration and Spontaneous Imbibition in Unconventional Liquid Reservoirs by Surfactant Additives", SPE Res 4:21): 107-117, Jun. 28, 2016.

Alzanam et al., "A Multiwalled Carbon Nanotube-Based Polyurethane Nanocomposite-Coated Sand/Proppant for Improved Mechanical Strength and Flowback Control in Hydraulic Fracturing Applications", ACS Omega, vol. 6, Issue 32, Aug. 5, 2021.

Arshadi et al., "Proppant-packed fractures in shale gas reservoirs: An in-situ investigation of deformation, wettability, and multiphase flow effects", Journal of Natural Gas Science and Engineering, vol. 59, Nov. 2018.

Arshadi et al., "The effect of deformation on two-phase flow through proppant-packed fractured shale samples: A micro-scale experimental investigation", Advances in Water Resources, vol. 105, Jul. 2017.

Calvin et al., "Enhancement of Well Production in the SCOOP Woodford Shale through the Application of Microproppant", Paper presented at the SPE Hydraulic Fracturing Technology Conference and Exhibition, The Woodlands, Texas, USA, Jan. 24, 2017.

Dahl et al., "Application of Micro-Proppant to Enhance Well Production in Unconventional Reservoirs: Laboratory and Field Results", Paper presented at the SPE Western Regional Meeting, Garden Grove, California, USA, Apr. 27, 2015.

Dong et al., "Effect of surface wettability of ceramic proppant on oil flow performance in hydraulic fractures", Energy Science & Engineering, vol. 7, issue 2, Feb. 19, 2019.

Edward Furimsky, "Characterization of cokes from fluid/flexicoking of heavy feeds", Fuel Processing Technology, vol. 67, No. 3, 205-230, XP055559715, Sep. 1, 2000, 5 pages.

Elkhatib et al., "Pore-Scale Study of Wettability Alteration and Fluid Flow in Propped Fractures of Ultra-Tight Carbonates", Langmuiir, col. 39 Issue 5, Jan. 24, 2023.

Go et al., "Evaluation of Coated Proppant Unconventional Performance", Energy & Fuels, vol. 35, Issue 11, May 17, 2021.

Huang et al., "Effects of Proppant Wettability and Size on Transport and Retention of Coal Fines in Saturated Proppant Packs: Experimental and Theoretical Studies", Energy Fuels 2021, 35, 15, 11976-11991, Jul. 7, 2021.

International Search Report and the Written Opinion of the International Searching Authority, mailed Jun. 13, 2022, International Application No. PCT/US2022/070811, 10 pages.

International Search Report and the Written Opinion of the International Searching Authority, mailed Jun. 13, 2022, International Application No. PCT/US2022/070776, 10 pages.

International Search Report and the Written Opinion of the International Searching Authority, mailed May 19, 2023, International Application No. PCT/US2023/062816, 10 pages.

Jackson et al., "Stimulation Design and Treatment in the Sycamore Formation of the South Central Oklahoma Oil Province Area of the Anadarko Basin", Paper presented at the SPE Hydraulic Fracturing Technology Conference and Exhibition, The Woodlands, Texas, USA, Jan. 23, 2018.

Kumar et al., "The Role of Micro-Proppants in Conductive Fracture Network Development", Paper presented at the SPE Hydraulic Fracturing Technology Conference and Exhibition, The Woodlands, Texas, USA, Jan. 29, 2019.

Labus K. et al., "IOP Conference Series: Earth and Environmental Science Paper @Bullet Open Access the concept of coke based proppants for coal bed fracturing", XP055798892, Dec. 31, 2019, 12 pages.

Lau et al., "Maximizing Production from Shale Reservoir by Using Micro-Sized Proppants", Paper presented at the International Petroleum Technology Conference, Beijing, China, Mar. 22, 2019.

Le et al., "Methane foam performance in oil-wet unconsolidated porous media: A systematic experimental investigation at reservoir conditions", Fuel, vol. 344, Jul. 15, 2023.

Liao et al., "Lightweight proppants in unconventional oil and natural gas development: A review", Sustainable Materials and Technologies, vol. 33, Sep. 2022.

Mishra Debesh Devadutta, "Thermal Analysis of Polyethylene Terephthalate (PET)-Coke Composites Prepared by Mechanical Alloying Technique", XP055926292, DOI: 10.20944/preprints201608. 0099.vl, Aug. 2, 2016, 21 pages.

Montgomery et al., "Utilizing Discrete Fracture Modeling and Microproppant to Predict and Sustain Production Improvements in (56) References Cited

OTHER PUBLICATIONS

Nano Darcy Rock", Paper presented at the SPE Hydraulic Fracturing Technology Conference and Exhibition, The Woodlands, Texas, USA, Jan. 28, 2020.

Ngata et al., "Review of Developments in Nanotechnology Application for Formation Damage Control", Energy & Fuels, vol. 36, Issue 1, Dec. 27, 2021.

Palisch et al., "Initial Observations From a Bakken Microproppant Field Trial", Paper presented at the SPE Hydraulic Fracturing Technology Conference and Exhibition, The Woodlands, Texas, USA, Jan. 24, 2023.

Radwan et al., "An Engineered Microparticles-Based Slurry Pumped in Over 10,000 Stages Provided Notable Operational and Production Improvements in Challenging Formations", Paper presented at the SPE Annual Technical Conference and Exhibition, Houston, Texas, USA, Sep. 26, 2022.

Tabatabaei et al., "Surface Modification of Proppant Using Hydrophobic Coating to Enhance Long-Term Production", SPE Production & Operations, vol. 36, Issue 1, Feb. 10, 2021.

Wang et al., "Effect of Fluid Contact Angle of Oil-Wet Fracture Proppant on the Competing Water/Oil Flow in Sandstone-Proppant Systems", Sustainability, Mar. 23, 2022.

Wang et al., "Experimental and numerical investigations of water-oil two-phase flow in fractures with proppants of different wetting properties", Journal of Petroleum Science and Engineering, vol. 214, Jul. 2022.

White Paper, "Significant Uplift Achieved with Production Enhancement Product", The Future of Well Enhancement, Deeprop Microproppant, 8 pages.

Wu et al., "An Experimental Investigation of the Conductivity of Unpropped Fractures in Shales", Paper presented at the SPE Hydraulic Fracturing Technology Conference and Exhibition, The Woodlands, Texas, USA, Jan. 24, 2017.

Xiao et al., "Effect of surface wetting behavior of ceramic proppant on the two-phase flow across the interface of sandstone and fracture", Energy Science & Engineering, vol. 8 issue 4, Dec. 19, 2019.

Chang, F.F., Berger, P.D., Lee C.H., "In-Situ Formation of Proppant and Highly Permeable Blocks for Hydraulic Fracturing", SPE-173328-MS, presented at SPE Hydraulic Fracturing Technology Conference, Woodlands, TX Feb. 3-5, 2015. Abstract.

International Search Report and Written Opinion, dated Apr. 27, 2021 issued in related PCT Application No. PCT/US2021/015152, 12 pages.

International Search Report and Written Opinion, dated Apr. 27, 2021 issued in related PCT Application No. PCT/US2021/015153, 11 pages.

International Search Report and Written Opinion, dated Jun. 18, 2023 issued in related PCT Application No. PCT/US2023/063275, 9 pages.

International Search Report and the Written Opinion of the International Searching Authority, mailed Feb. 28, 2025, International Application No. PCT/US2024/056651, 9 pages.

International Search Report and the Written Opinion of the International Searching Authority, mailed Feb. 17, 2025, International Application No. PCT/US2024/056647, 12 pages.

International Search Report and the Written Opinion of the International Searching Authority, mailed Feb. 17, 2025, International Application No. PCT/US2024/056648, 15 pages.

International Search Report and the Written Opinion of the International Searching Authority, mailed Feb. 17, 2025, International Application No. PCT/US2024/056649, 13 pages.

International Search Report and the Written Opinion of the International Searching Authority, mailed Feb. 24, 2025, International Application No. PCT/US2024/056652, 12 pages.

\* cited by examiner

POLYOLEFIN-COKE COMPOSITE GRANULES AS A HYDRAULIC FRACTURING PROPPANT

CROSS-REFERENCE TO RELATED APPLICATION

This application is the U.S. National Stage Application of the International Application No. PCT/US2022/070776, entitled "POLYOLEFIN-COKE COMPOSITE GRANULES AS A HYDRAULIC FRACTURING PROPPANT," filed on Feb. 23, 2022, the disclosure of which is hereby incorporated by reference in its entirety, which claims priority to and the benefit of U.S. Provisional Application No. 63/186,958 having a filing date of May 11, 2021, the disclosure of which is incorporated herein by reference in its entirety.

FIELD OF THE INVENTION

The techniques described herein relate to the hydrocarbon production field. More specifically, the techniques described herein relate to hydraulic fracturing operations and proppants employed therein.

BACKGROUND OF THE INVENTION

This section is intended to introduce various aspects of the art, which may be associated with embodiments of the present techniques. This discussion is believed to assist in providing a framework to facilitate a better understanding of particular aspects of the present techniques. Accordingly, it should be understood that this section should be read in this light, and not necessarily as admissions of prior art.

A wellbore is drilled into a subterranean formation to promote removal (or production) of a hydrocarbon resource therefrom. In many cases, the subterranean formation needs to be stimulated in some manner to promote removal of the hydrocarbon resource. Stimulation operations include any operation performed upon the matrix of a subterranean formation to improve hydraulic conductivity there through, including hydraulic fracturing, which is a common stimulation operation for unconventional reservoirs.

Hydraulic fracturing operations involve the pumping of large quantities of a pressurizing fluid stream (often referred to as a "fracturing fluid") into a subterranean formation (e.g., a low-permeability formation) under high hydraulic pressure to promote the formation of one or more fractures within the matrix of the subterranean formation and to create high-conductivity flow paths. Moreover, as the pressurizing fluid stream is pumped into the formation, primary fractures extending from the wellbore and, in some instances, secondary fractures extending from the primary fractures, possibly dendritically, are formed. These fractures may be vertical, horizontal, or a combination of directions forming a tortuous path.

Once the pressurizing fluid stream has created the fractures within the subterranean formation, a proppant is typically pumped into the fractures to "prop" the fractures open after the hydraulic pressure has been released following the hydraulic fracturing operation. Specifically, upon reaching the fractures, the proppant settles therein to form a proppant pack that prevents the fractures from closing once the hydraulic pressure has been released. In this manner, the proppant provides a long-term increase in fluid permeability within the near-wellbore region of the formation.

Conventional proppants typically include sand and/or ceramics. However, hydraulic fracturing operations utilizing such conventional proppants often encounter difficulties, such as, in particular, difficulties associated with the deposition of the proppant within the fractures that have been created or extended under hydraulic pressure. Because conventional proppants generally have densities that are significantly higher than that of the pressurizing fluid stream, effective transport of the proppant within the formation may be difficult due to settling. This, in turn, may limit the effective reach and/or depth to which the proppant can be utilized, making it challenging to distribute the proppant into more remote reaches of a network of fractures. In addition, fine-grained particles (referred to as "fines") produced from crushing of the proppant within the fractures can also lessen hydraulic conductivity, which may decrease production rates and/or necessitate wellbore cleanout operations.

With this in mind, lower-density proppants are desirable in certain circumstances. However, although low-density proppants (often referred to as "light proppants" or "ultra-light proppants") have been developed, such proppants often do not exhibit the necessary mechanical, thermal, and/or chemical stability to be effective proppants within hydrocarbon wells.

Specifically, currently-available low-density proppants do not exhibit sufficient compressive strengths and hydraulic conductivities to successfully compete with conventional, sand-based proppants and/or are not cost-competitive with conventional, sand-based proppants. Thus, there exists a need for improved low-density proppants for hydraulic fracturing operations.

SUMMARY OF THE INVENTION

An embodiment described herein provides a hydrocarbon well. The hydrocarbon well includes a wellbore that extends within a subsurface region and a downhole tubular that extends within the wellbore and defines a tubular conduit. The hydrocarbon well also includes a number of perforations formed within the downhole tubular and a number of fractures formed within the subsurface region proximate to the perforations. The hydrocarbon well further includes a proppant positioned within at least a portion of the fractures. The proppant includes a number of polyolefin-coke composite granules. A characteristic dimension of each polyolefin-coke composite granule is at least 50 micrometers (μm) and at most 3 millimeters (mm). Moreover, each polyolefin-coke composite granule includes a number of polyolefin polymer chains and at least one petroleum coke granule.

Another embodiment described herein provides a method of completing a hydrocarbon well. The method includes positioning a perforation device within a tubular conduit of a downhole tubular, where the downhole tubular extends within a wellbore of the hydrocarbon well, and where the wellbore extends within a subsurface region. The method also includes perforating the downhole tubular using the perforation device to define a number of perforations within the downhole tubular, as well as pressurizing the tubular conduit with a pressurizing fluid stream to fracture a number of zones of the subsurface region that are proximate to the perforations, forming a number of corresponding fractures within the subsurface region. The method further includes flowing a proppant into at least a portion of the fractures, via the perforations, to prop the fractures with the proppant, where the proppant includes a number of polyolefin-coke composite granules, where a characteristic dimension of each polyolefin-coke composite granule is at least 50 µm and at most 3 mm, and where each polyolefin-coke composite granule includes a number of polyolefin polymer chains and at least one petroleum coke granule.

Another embodiment described herein provides a proppant including a number of polyolefin-coke composite granules. A characteristic dimension of each polyolefin-coke composite granule is at least 50 µm and at most 3 mm. Moreover, each polyolefin-coke composite granule includes a number of polyolefin polymer chains and at least one petroleum coke granule.

These and other features and attributes of the disclosed embodiments of the present disclosure and their advantageous applications and/or uses will be apparent from the detailed description which follows.

BRIEF DESCRIPTION OF THE DRAWINGS

To assist those of ordinary skill in the relevant art in making and using the subject matter thereof, reference is made to the appended drawings.

It should be noted that the figures are merely examples of the present techniques and are not intended to impose limitations on the scope of the present techniques. Further, the figures are generally not drawn to scale, but are drafted for purposes of convenience and clarity in illustrating various aspects of the techniques.

DETAILED DESCRIPTION OF THE INVENTION

In the following detailed description section, the specific examples of the present techniques are described in connection with preferred embodiments. However, to the extent that the following description is specific to a particular embodiment or a particular use of the present techniques, this is intended to be for example purposes only and simply provides a description of the embodiments. Accordingly, the techniques are not limited to the specific embodiments described below, but rather, include all alternatives, modifications, and equivalents falling within the true spirit and scope of the appended claims.

Definitions

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, the singular forms "a," "an," and "the" mean one or more when applied to any embodiment described herein. The use of "a," "an," and/or "the" does not limit the meaning to a single feature unless such a limit is specifically stated.

The terms "about" and "around" mean a relative amount of a material or characteristic that is sufficient to provide the intended effect. The exact degree of deviation allowable in some cases may depend on the specific context, e.g., ±1%, ±5%, ±10%, ±15%, etc. It should be understood by those of skill in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described are considered to be within the scope of the disclosure.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the term "any" means one, some, or all of a specified entity or group of entities, indiscriminately of the quantity.

As used herein, the term "apparent density," with reference to the density of proppant particulates, refers to the density of the individual particulates themselves, which may be expressed in grams per cubic centimeter ($g/cm^3$). The apparent density values provided herein are based on the American Petroleum Institute's Recommended Practice 19C (hereinafter "API RP-19C") standard, entitled "Measurement of Properties of Proppants Used in Hydraulic Fracturing and Gravel-packing Operations" (First Ed. May 2008, Reaffirmed June 2016).

As used herein, the phrase "based on" does not mean "based only on," unless expressly specified otherwise. In other words, the phrase "based on" means "based only on," "based at least on," and/or "based at least in part on."

The phrase "at least one," in reference to a list of one or more entities, should be understood to mean at least one entity selected from any one or more of the entities in the list of entities, but not necessarily including at least one of each and every entity specifically listed within the list of entities, and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the term "crush strength," with reference to proppant particulates, refers to the stress load proppant particulates can withstand prior to crushing (e.g., breaking or cracking). The crush strength values provided herein are based on API RP-19C.

As used herein, the terms "example," exemplary," and "embodiment," when used with reference to one or more components, features, structures, or methods according to the present techniques, are intended to convey that the described component, feature, structure, or method is an illustrative, non-exclusive example of components, features, structures, or methods according to the present techniques. Thus, the described component, feature, structure, or method is not intended to be limiting, required, or exclusive/exhaustive; and other components, features, structures, or methods, including structurally and/or functionally similar and/or equivalent components, features, structures, or methods, are also within the scope of the present techniques.

As used herein, the term "flexicoke" refers to the solid concentrated carbon material produced from FLEXICOKING™. The term "FLEXICOKING™" refers to a thermal cracking process utilizing fluidized solids and gasification for the conversion of heavy, low-grade hydrocarbon feeds into lighter hydrocarbon products (e.g., upgraded, more valuable hydrocarbons).

As used herein, the term "fluid coke" refers to the solid concentrated carbon material remaining from fluid coking. The term "fluid coking" refers to a thermal cracking process utilizing fluidized solids for the conversion of heavy, low-grade hydrocarbon feeds into lighter products (e.g., upgraded hydrocarbons), producing fluid coke as a byproduct.

As used herein, the term "hydraulic conductivity" refers to the ability of a fluid within a formation to pass through a fracture including proppant at various stress (or pressure) levels, which is based, at least in part, on the permeability of the proppant deposited within the fractures. The hydraulic conductivity values provided herein are based on the American Petroleum Institute's Recommended Practice 19D (API RP-19D) standard, entitled "Measuring the Long-Term Conductivity of Proppants" (First Ed. May 2008, Reaffirmed May 2015).

The term "petroleum coke" (or simply "coke") refers to a final carbon-rich solid material that is derived from oil refining. More specifically, petroleum coke is the carbonization product of high-boiling hydrocarbon fractions that are obtained as a result of petroleum processing operations. Petroleum coke is produced within a coking unit via a thermal cracking process in which long-chain hydrocarbons are split into shorter-chain hydrocarbons. As described herein, there are three main types of petroleum coke: delayed coke, fluid coke, and flexicoke. Each type of petroleum coke is produced using a different coking process; however, all three coking processes have the common objective of maximizing the yield of distillate products within a refinery by rejecting large quantities of carbon in the residue as coke.

The term "polyolefin" refers to a group of polymers obtained from the polymerization of simple olefin monomer units. In general, polyolefins are categorized as a type of thermoplastic, and they are characterized by being stiff, light, and hard. As an example, polypropylene (PP) is a polyolefin that is obtained from the polymerization of propylene. As another example, polyethylene (PE) is a polyolefin that is obtained from the polymerization of ethylene. There are several sub-groups of PEs, including high-density polyethylene (HDPE), low-density polyethylene (LDPE), and linear low-density polyethylene (LLDPE). Moreover, PE is commonly formed into a wax, referred to as PE wax, which is an ultra-lower-molecular-weight PE consisting of ethylene monomer chains.

As used herein, the term "proppant" refers to any suitable material that is capable of maintaining open an induced fracture within a formation during and following a hydraulic fracturing treatment for a corresponding wellbore.

The term "substantially," when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

In this discussion, a "Cx" hydrocarbon refers to a hydrocarbon compound that includes "x" number of carbons in the compound. A stream containing "Cx-Cy" hydrocarbons refers to a stream composed of one or more hydrocarbon compounds that includes at least "x" carbons and no more than "y" carbons in the compound. It is noted that a stream containing "Cx-Cy" hydrocarbons may also include other types of hydrocarbons, unless otherwise specified.

Certain embodiments and features are described herein using a set of numerical upper limits and a set of numerical lower limits. It should be appreciated that ranges from any lower limit to any upper limit are contemplated unless otherwise indicated. All numerical values are "about" or "approximately" the indicated value, and account for experimental errors and variations that would be expected by a person having ordinary skill in the art.

Furthermore, concentrations, dimensions, amounts, and/or other numerical data that are presented in a range format are to be interpreted flexibly to include not only the numerical values explicitly recited as the limits of the range, but also all individual numerical values or sub-ranges encompassed within that range, as if each numerical value and sub-range were explicitly recited. For example, a disclosed numerical range of 1 to 200 should be interpreted to include, not only the explicitly-recited limits of 1 and 200, but also individual values, such as 2, 3, 4, 197, 198, 199, etc., as well as sub-ranges, such as 10 to 50, 20 to 100, etc.

As described above, hydraulic fracturing operations utilizing conventional proppants, such as sand, often encounter difficulties associated the proppant settling out within fractures. Moreover, such settling is generally caused by the relatively high density of conventional proppants. As a result, light and ultralight proppants have been developed. However, such proppants are generally lacking in crush strength and/or hydraulic conductivity and, thus, are not highly effective in many cases.

Accordingly, embodiments described herein provide an improved proppant that is formed from polyolefin-coke composite granules. A characteristic dimension (e.g., particle size or diameter) of each composite granule is at least 50 micrometers (μm) and at most 3 millimeters (mm). In addition, each composite granule contains material that includes a number of polyolefin polymer chains and at least one petroleum coke granule. As an example, such polyolefin-coke composite granules may include fluid coke and/or flexicoke granules combined with polypropylene (PP), polyethylene (PE), or a blend of PP and PE. As another example, such polyolefin-coke composite granules may include fluid coke and/or flexicoke granules encapsulated within PE wax. Moreover, combining polyolefin and coke in this manner provides composite granules that are characterized by their low density and high crush strength, as described further herein. As a result, such composite granules are suitable for use as a light or ultralight proppant that alleviates the foregoing difficulties that are typically encountered when using conventional proppants.

Figure 1:
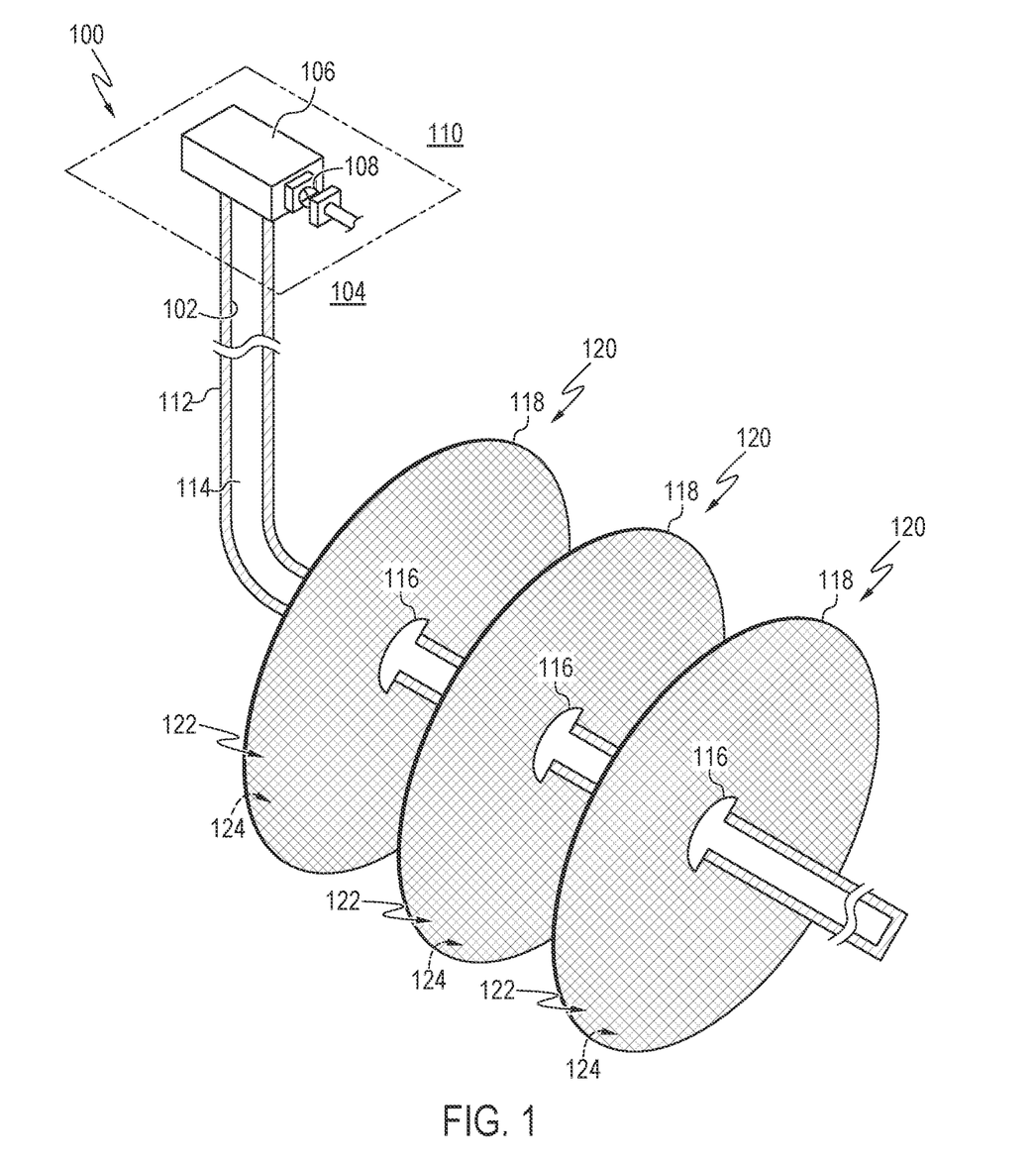
FIG. 1 is a schematic view of an exemplary hydrocarbon well that may be completed using polyolefin-coke composite granules as a proppant according to embodiments described herein.

Exemplary Hydrocarbon Well Including Polyolefin-Coke Composite Granules as Proppant FIG. 1 is a schematic view of an exemplary hydrocarbon well 100 that may be completed using polyolefin-coke composite granules as a proppant according to embodiments described herein. The exemplary hydrocarbon well 100 includes a wellbore 102 that extends within a subsurface region 104 including a hydrocarbon-bearing formation or reservoir, as well as a wellhead 106 including (among other components) a shut-in valve 108 that controls the flow of hydrocarbon fluids from the subsurface region 104 to a surface region 110. The hydrocarbon well 100 also includes a downhole tubular 112 that extends within the wellbore 102 and defines a tubular conduit 114 that provides a flow path for the hydrocarbons fluid to flow from the subsurface region 104 to the surface region 110. The downhole tubular 112 includes a number of perforations 116 and a number of fractures 118 formed within a number of zones (or stages) 120 corresponding to the subsurface region 104. As described herein, each fracture 118 may be formed responsive to flow of a pressurizing fluid stream through a corresponding perforation 116. As such, each fracture 118 may be proximate to (and/or associated with) the corresponding perforation 116.

The hydrocarbon well 100 further includes a proppant 122 positioned within the fractures 118 (or at least a portion thereof). As described further herein, the proppant 122 includes a number of polyolefin-coke composite granules. Each polyolefin-coke composite granules may include and/or contain a number of polyolefin polymer chains and one or more petroleum coke granules. In some embodiments, the polyolefin polymer chains within each polyolefin-coke composite granule include PP, PE (e.g., HDPE), a blend of PP and PE, or PE wax. In addition, in some embodiments, the petroleum coke granule(s) within each polyolefin-coke composite granule include one or more flexicoke granule, one or more fluid coke granules, one or more pulverized delayed coke granules, or any combination thereof.

In some embodiments, one or more of the fractures 118 includes a conventional proppant 124 positioned therein, in addition (or alternatively) to the proppant 122 including the polyolefin-coke composite granules. Examples of suitable conventional proppants include sand, bauxite, and/or ceramic granules or particulates. In various embodiments, the density of the conventional proppant 124 is greater than the density of the proppant 122 including the polyolefin-coke composite granules. Specifically, in various embodiments, the density of the conventional proppant 124 is in a range between about 2.6 grams per cubic centimeter (g/cc) to about 3.5 g/cc, while the density of the proppant 122 including the polyolefin-coke composite granules is in a range between about 0.95 g/cc to about 1.6 g/cc. Accordingly, in various embodiments, the density of the conventional proppant 124 is at least about 1.5 to about 3.5 times greater than the density of the proppant 122 including the polyolefin-coke composite granules.

In some embodiments, the conventional proppant 124 and the proppant 122 including the polyolefin-coke composite granules are both positioned within each fracture 118. Stated another way, each fracture 118 may include both the conventional proppant 124 and the proppant 122 including the polyolefin-coke composite granules. For example, in some embodiments, the conventional proppant 124 and the proppant 122 including the polyolefin-coke composite granules are uniformly distributed throughout the fractures 118. As another example, in some embodiments, the conventional proppant 124 is preferentially positioned within a first portion (or subset) of the fractures 118, while the proppant 122 including the polyolefin-coke composite granules is preferentially positioned within a second portion (or subset) of the fractures 118. This positioning of the conventional proppant 124 and the proppant 122 including the polyolefin-coke composite granules may be passively created, for example, as a result of the difference in density between the two proppants 112 and 118. As a more specific example, the proppant 122 including the polyolefin-coke composite granules may be preferentially positioned within relatively shallower regions of the subsurface region 104 and/or within fractures 118 that are associated with relatively shallower layers 116, while the conventional proppant 124 may be preferentially positioned within relatively deeper regions of the subsurface region 104 and/or within fractures 118 that are associated with relatively deeper layers.

Additionally or alternatively, this preferential positioning of the conventional proppant 124 and the proppant 122 including the polyolefin-coke composite granules may be actively and/or purposefully created. As an example, during completion of the hydrocarbon well 100, the proppants 122 and 124 may be provided to the wellbore 102 and/or flowed into the fractures 118 such that the conventional proppant 124 is preferentially positioned within the first portion of the fractures 118 and the proppant 122 including the polyolefin-coke composite granules is preferentially positioned within the second portion of the fractures 118, as described in more detail with respect to FIG. 2.

The schematic view of FIG. 1 is not intended to indicate that the hydrocarbon well 100 is to include all of the components shown in FIG. 1, or that the hydrocarbon well 100 is limited to only the components shown in FIG. 1. Rather, any number of components may be omitted from the hydrocarbon well 100 or added to the hydrocarbon well 100, depending on the details of the specific implementation. Moreover, those skilled in the art will appreciate that, while the hydrocarbon well 100 is depicted as including only three zones, with one perforation and one corresponding fracture per zone, this is for case of illustration only. In practice, the hydrocarbon well 100 may include, for example, around 20 to 100 individual zones (or stages), with each stage including around 3 to 20 perforation clusters, where each perforation cluster typically includes a series of around 12 to 18 perforations extending over a 1-foot to 3-foot region, and where each zone is typically separated by around 10 to 100 feet along the length of the wellbore 102. Furthermore, those skilled in the art will appreciate that, while the hydrocarbon well 100 is depicted as including a vertical section and a horizontal section, the hydrocarbon well 100 may include any number of additional or alternative lateral, deviated, and/or highly-deviated sections extending in various directions throughout the subsurface region 104. In addition, in some embodiments, the wellhead 106 is a splitter-type wellhead that connects to a number of hydrocarbon wells 100 within the subsurface region 104.

Figure 2:
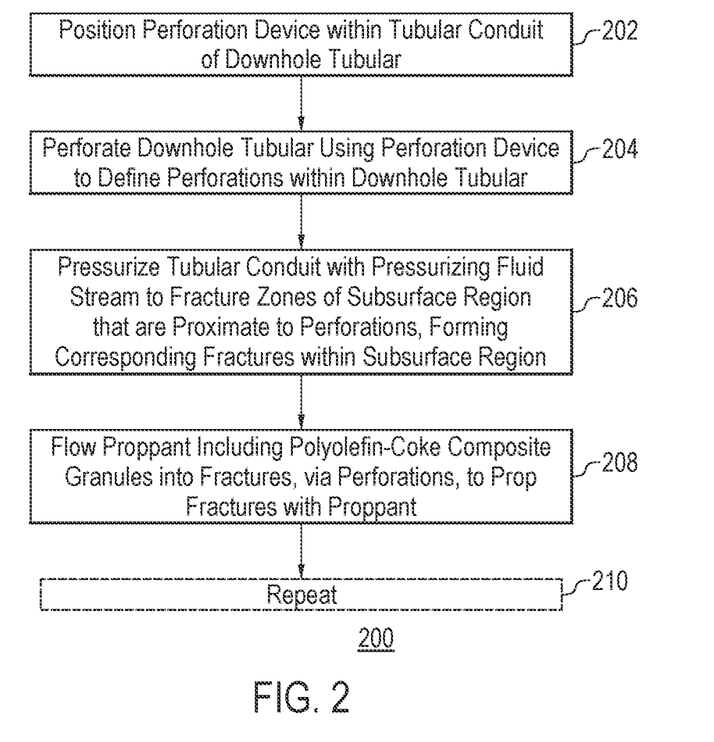
FIG. 2 is a process flow diagram of an exemplary method for completing a hydrocarbon well using polyolefin-coke composite granules as a proppant according to embodiments described herein.

Exemplary Method of Completing Hydrocarbon Well Using Polyolefin-Coke Composite Granules as Proppant FIG. 2 is a process flow diagram of an exemplary method 200 for completing a hydrocarbon well (such as the exemplary hydrocarbon well 100 described with respect to FIG. 1) using polyolefin-coke composite granules as a proppant according to embodiments described herein. The method 200 begins at block 202, at which a perforation device is positioned within a tubular conduit of a downhole tubular, where the downhole tubular extends within a wellbore of the hydrocarbon well, and where the wellbore extends within a subsurface region. This may be performed in any suitable manner. As an example, the perforation device may be flowed in a downhole direction and/or in and/or within a conveyance fluid stream that may be provided to the tubular conduit. As another example, an umbilical may be utilized to position the perforation device within the tubular conduit and/or to retain the perforation device within a target (or desired) region of the tubular conduit. As another example, the umbilical may be utilized to pull the perforation device in an uphole direction to position the perforation device within the tubular conduit and/or within the target region of the tubular conduit. Examples of a suitable umbilical for this purpose include a slickline, a wireline, coiled tubing, and/or a workover string.

At block 204, the downhole tubular is perforated using the perforation device to define (or create) a number of perforations within the downhole tubular. This may be accomplished in any suitable manner. As an example, the perforation device may include and/or be a shaped charge perforation device that includes a number of shaped charges. In this example, the downhole tubular may be perforated by igniting and/or discharging at least a subset of the shaped charges to form and/or define the perforations within the downhole tubular.

At block 206, the tubular conduit is pressurized with a pressurizing fluid stream to fracture a number of zones of the subsurface region that are proximate to the perforations, forming a number of corresponding fractures within the subsurface region. In various embodiments, this includes flowing the pressurizing fluid stream into the tubular conduit in a manner that increases the pressure within the tubular conduit. This, in turn, may cause the pressurizing fluid stream within the tubular conduit to flow into the subsurface region via the perforations, which may locally pressurize the subsurface region such that the fractures are formed within the subsurface region. Examples of a suitable pressurizing fluid stream for this purpose include an incompressible fluid, an at least substantially incompressible fluid, a liquid, and/or water (such as, for example, slickwater).

At block 208, a proppant including a number of polyolefin-coke composite granules is flowed into at least a portion of the fractures, via the perforations, to prop the fractures with the proppant. The proppant including the polyolefin-coke composite granules may be flowed into the fractures in any suitable manner. For example, in various embodiments, the proppant including the polyolefin-coke composite granules is flowed into the fractures within the pressurizing fluid stream, in which case the pressurizing fluid stream and the proppant form a proppant mixture (commonly referred to as "fracturing fluid").

According to embodiments described herein, each polyolefin-coke composite granule within the proppant includes a characteristic dimension of at least 50 μm and at most 3 mm. In addition, each polyolefin-coke composite granule includes a number of polyolefin polymer chains and one or more petroleum coke granules. The polyolefin polymer chains within the polyolefin-coke composite granules may include, for example, polypropylene (PP), polyethylene (PE), a blend of PP and PE, and/or PE wax. The petroleum coke granule(s) within the polyolefin-coke composite granules may include, for example, one or more flexicoke granules, one or more fluid coke granules, one or more delayed coke granules that have been pulverized (or ground) to a suitable size, or any combination thereof. As a more specific example, in some embodiments, the polyolefin polymer chains include PE wax, and the one or more petroleum coke granules are encapsulated within the PE wax, as described further herein.

In various embodiments, the method 200 at block 208 further includes flowing a conventional proppant into at least a portion of the fractures, via the perforations, to prop the fractures with the conventional proppant. In some embodiments, this includes concurrently flowing the conventional proppant and the proppant including the polyolefin-coke composite granules into the fractures. In other embodiments, this includes flowing the conventional proppant into a first portion of the fractures and flowing the proppant including the polyolefin-coke composite granules into a second portion of the fractures. For example, in such embodiments, the conventional proppant or the proppant including the polyolefin-coke composite granules may be initially flowed into the fractures. At some point, the initial flow may be stopped, and the other proppant may then be flowed into the fractures. In some cases, such a configuration may permit and/or facilitate stratification, layering, and/or segregation of the conventional proppant and the proppant including the polyolefin-coke composite granules within the fracture and may, under certain conditions, produce and/or generate improved and/or increased propping of and/or fluid permeability within the fractures. Furthermore, as a more specific example, the conventional proppant, which may be less expensive and/or more readily available relative to the proppant including the polyolefin-coke composite granules, may be flowed into fractures associated with more uphole zones of the subsurface region, while the proppant including the polyolefin-coke composite granules, which may more readily remain in suspension within the pressurizing fluid stream relative to the conventional proppant, may be flowed into more downhole zones of the subsurface region. Such a configuration may permit and/or facilitate performing completion operations within a given hydrocarbon well utilizing relatively lower overall, or average, flow rates of the pressurizing fluid stream and/or may permit and/or facilitate propping of zones of the subsurface region that are farther downhole than otherwise would be feasible utilizing solely conventional proppant.

At optional block 210, at least the portion of the block 202-208 of the method 200 may be repeated. This may include repeating any suitable blocks in any suitable manner and/or in any suitable order. As an example, this may include repeating the positioning at block 202, the perforating at block 204, the pressurizing at block 206, and the flowing at block 208 to fracture and prop a number spaced-apart zones (or stages) of the subsurface region, as illustrated schematically in FIG. 1.

The process flow diagram of FIG. 2 is not intended to indicate that the steps of the method 200 are to be executed in any particular order, or that all of the steps of the method 200 are to be included in every case. Further, any number of additional steps not shown in FIG. 2 may be included within the method 200, depending on the details of the specific implementation.

Exemplary Properties of Polyolefin-Coke Composite Granules that are Suitable for Use as Proppant Embodiments described herein provide a proppant including a novel combination of petroleum coke and polyolefins that exhibits a number of characteristics that render it, not only a viable alternative for conventional proppants, but further a surprising substitute with enhanced functionality. In particular, with regard to the use of petroleum coke within a proppant, petroleum coke is conventionally used as a fuel source in various manufacturing processes for heat. However, coke is a low-BTU fuel source. Therefore, by using coke as a proppant rather than as a fuel source, $CO_2$ emissions may be reduced as a result of higher-BTU fuel sources replacing the coke as a fuel source. In effect, using coke as a proppant is a form of sequestering carbon that would otherwise contribute to $CO_2$ emissions. Moreover, the costs associated with hydraulic fracturing may also be reduced, at least in part because large volumes of coke are readily available from already-existent petroleum refinery process streams and are typically cost-competitive to sand. As described herein, coke also has sufficient crush strength to maintain propped fractures upon the removal of hydraulic pressure and to maintain efficient conductivity once the wellbore is brought on production. In addition, the relatively low density of coke may decrease or eliminate the need to use gelled fracturing fluids, thereby avoiding the costs associated with gelation. Furthermore, using coke may potentially reduce required pumping pressures, reduce overall water consumption, and avoid the need for frequent wellbore cleanout operations.

In addition, with regard to the use of polyolefins within a proppant, polyolefins have relatively low densities that render them particularly suitable for hydraulic fracturing applications. For example, polyethylene (PE) wax has a density of around 0.92 to around 0.94 g/cc, highly-cross-linked PEs (e.g., HDPE) have a density of around 0.92 to around 0.96 g/cc, and polypropylene (PP) has a density of around 0.92 to around 0.96 g/cc. Moreover, polyolefins can be compounded with fillers (e.g., PE/PP compounds with carbon black) to increase their compressive strength to a suitable level for hydraulic fracturing operations.

The novel combination of petroleum coke and polyolefins in the form of the polyolefin-coke composite granules described herein further provides additional advantages that are not provided by the use of each component separately. Specifically, while coke granules are prone to the formation of fine-grained particles (or fines) when subjected to large amounts of compression, polyolefins are not very prone to the formation of fines due, at least in part, to their thermoplastic nature. In addition, while polyolefins are susceptible to high degrees of ductile deformation (also due, at least in part, to their thermoplastic nature), coke granules are not highly susceptible to ductile deformation. Therefore, combining petroleum coke with polyolefins according to embodiments described herein produces composite granules with a sufficient amount of structural integrity to maintain propped fractures for an extended period of time without experiencing significant fines formation or ductile deformation. Moreover, due to the individual characteristics of petroleum coke and polyolefins, the resulting proppant including the composite granules is suitable for use as a light or ultralight proppant for hydraulically fracturing tight formations.

Turning now to details regarding the properties of the polyolefin-coke composite granules described herein, such composite granules may include any suitable type(s) of petroleum coke granules. For example, in various embodiments, the composite granules include flexicoke granules, alone or in combination with other types of coke granules. Flexicoke is a type of petroleum coke that is produced via the FLEXICOKING™ process. Briefly, the FLEXICOKING™ process integrates a cracking reactor, a heater, and a gasifier into a common fluidized-solids (coke) circulating system. A feed stream (of residua) is fed into a fluidized bed, along with a stream of hot recirculating material to the reactor. From the reactor, a stream containing coke is circulated to the heater vessel, where it is heated. The hot coke stream is sent from the heater to the gasifier, where it reacts with air and steam. The gasifier product gas, referred to as coke gas, containing entrained coke particles, is returned to the heater and cooled by cold coke from the reactor to provide a portion of the reactor heat requirement, which is typically about 496° C. to about 538° C. A return stream of coke sent from the gasifier to the heater provides the remainder of the heat requirement. The coke meeting the heat requirement is then circulated to the reactor, and the feed stream is thermally cracked to produce light hydrocarbon liquids that are removed from the reactor and recovered using conventional fractionating equipment. Fluid coke is formed from the thermal cracking process and settles (deposits) onto the "seed" fluidized bed coke already present in the reactor. The resultant at least partially gasified coke is flexicoke. In some instances, the coke from the thermal cracking process deposits in a pattern that appears ring-like atop the surface of the seed coke. Flexicoke is continuously withdrawn from the system during normal FLEXICOKING™ processing (e.g., from the reactor or after it is streamed to the heater via an elutriator) to ensure that the system maintains particles of coke in a fluidizable particle size range. Accordingly, flexicoke is a readily available byproduct of the FLEXICOKING™ process.

The gasification process of FLEXICOKING™ results in substantial concentration of metals in the flexicoke product and additionally allows for operational desulfurization of sulfur from the flexicoke. The gasification can be minimized or maximized to influence the sulfur content (minimization=lower sulfur content). Accordingly, unlike cokes formed in other processes, flexicoke has a comparatively high metal content and a comparatively lower sulfur content that can be manipulated.

In various embodiments, the flexicoke granules described herein may have a carbon content of about 85 wt % to about 99 wt %; a weight ratio of carbon to hydrogen of about 80:1 to about 95:1; and an impurities content (i.e., a weight percent of all components other than carbon and hydrogen) of about 1 wt % to about 10 wt %. Flexicoke also has a higher metal content than other cokes. In particular, the flexicoke granules described herein may have a combined vanadium and nickel content of about 3,000 ppm to about 45,000 ppm. In addition, the flexicoke granules described herein may have a sulfur content of 0 wt % to about 5 wt %, as well as a nitrogen content of 0 wt % to about 3 wt %.

The apparent density of the flexicoke granules described herein may be in the range of about 1.0 g/cc to about 2.0 g/cc. Traditional sand-based proppants generally have apparent densities greater than about 2.5 $g/cm^3$. Thus, the flexicoke granules described herein have substantially lesser apparent densities compared to conventional, sand-based proppants, which is indicative of their comparably more effective transport and lower settling rates within a fracture formed as part of a hydraulic fracturing operation.

As another example, in various embodiments, the polyolefin-coke composite granules include fluid coke granules, alone or in combination with other types of coke granules. Such fluid coke granules are obtained via a fluid coking process. Generally-speaking, flexicoke is considered to be a type (or subset) of fluid coke. Therefore, as expected, the fluid coke granules described herein include a number of the same (or similar) characteristics as flexicoke. However, the fluid coking process may be manipulated in various ways to produce fluid coke granules having a number of distinctive characteristics. For example, the fluid coke granules described herein may have a carbon content of about 75 wt % to about 93 wt %; a weight ratio of carbon to hydrogen of about 30:1 to about 50:1; and an impurities content of about 5 wt % to about 25 wt %. The fluid coke granules described herein may also have a sulfur content of about 3 wt % to about 10 wt %, as well as a nitrogen content of about 0.5 wt % to about 3 wt %. In addition, the apparent density of the fluid coke granules described herein may be in the range of about 1.4 g/cc to about 2.0 g/cc.

Furthermore, as another example, in some embodiments, the polyolefin-coke composite granules include delayed coke granules, alone or in combination with other types of coke granules. Delayed coke is a type of coke that is produced within a delayed coking unit via a delayed coking process. According to the delayed coking process, a preheated feedstock is introduced into a fractionator, where it undergoes a thermal cracking process in which long-chain hydrocarbons are split into shorter-chain hydrocarbons. The resulting lighter fractions are then removed as sidestream products. The fractionator bottoms, which include a recycle stream of heavy product, are heated in a furnace, which typically has an outlet temperature of around 480° C. to around 515° C. The heated feedstock then enters a reactor, referred to as a "coke drum," which typically operates at temperatures of around 415° C. to around 450° C. Within the coke drum, the cracking reactions continue. The resulting cracked products then exit the coke drum as an overhead stream, while coke deposits on the inner surface of the coke drum. In general, this process is continued for a period of around 16 hours to around 24 hours to allow the coke drum to fill with coke. In addition, to allow the delayed coking unit to operate on a batch-continuous (or semi-continuous) basis, two or more coke drums are used. While one coke drum is on-line filling with coke, the other coke drum is being steam-stripped, cooled, decoked (e.g., via hydraulically cutting the deposited coke with water), pressure-checked, and warmed up. Moreover, the overhead stream exiting the coke drum enters the fractionator, where naphtha and heating oil fractions are recovered. The heavy recycle material is then typically combined with preheated fresh feedstock and recycled back into the process.

The delayed coke granules described herein may exhibit the following properties: (1) a carbon content of about 82 wt % to about 90 wt %; (2) a weight ratio of carbon to hydrogen of about 15:1 to about 30:1; (3) a combined vanadium and nickel content of about 100 ppm to about 3,000 ppm; (4) a sulfur content of 2 wt % to about 8 wt %; and/or (5) a nitrogen content of 1 wt % to about 2 wt %, where such properties are measured on a dry, ash-free basis (or, in other words, not counting residual ash content and removing moisture before the analysis). In addition, the delayed coke granules described herein may have a moisture content of around 6 wt % to around 14 wt % and a volatile matter content of around 6 wt % to around 18 wt %, as measured on an as-received basis. Moreover, the apparent density of the delayed coke granules described herein may be in the range of about 1.0 g/cc to about 1.7 g/cc. Furthermore, the crush strength of the delayed coke granules described herein may be comparable to the crush strengths of other types of coke granules.

Notably, however, if delayed coke is used, alone or in combination with other types of coke granules, some amount of preprocessing is required to pulverize (or grind) the delayed coke to a suitable particle size. Therefore, while delayed coke is available in significantly larger quantities than fluid coke or flexicoke, it may be generally preferable to use flexicoke and/or fluid coke granules within the polyolefin-coke composite granules described herein.

Furthermore, in some embodiments, the characteristic dimension (e.g., particle size or diameter) of each polyolefin-coke composite granule is at least partially dependent on the type(s) of petroleum coke granules utilized. In particular, while the characteristic dimension of each polyolefin-coke composite granule may be within the range of about 50 μm and to about 3 mm, the actual characteristic dimension of each polyolefin-coke composite granule will vary depending on the sizes of the coke granules. In general, fluid coke and flexicoke granules may be as small as 50 μm, and delayed coke particles may also be crushed to produce granules as small as 50 μm (or even smaller), depending on the type of grinding or milling technique used. Accordingly, those skilled in the art will appreciate that, while the polyolefin-coke composite granules are described herein as including a characteristic dimension of 50 μm to 3 mm, the actual characteristic dimension of each polyolefin-coke composite granule may be modified and adapted to each particular implementation. As an example, in some embodiments, the polyolefin-coke composite granules may be formed such that the characteristic dimension of each granule roughly correlates to the characteristic dimension of conventional proppants, such as sand, which typically range from about 100 μm to about 600 μm. Alternatively, in other embodiments, the polyolefin-coke composite granules may be formed such that the characteristic dimension of each granule is smaller than (or, in some cases, larger than) the characteristic dimension of conventional proppants. For example, in such embodiments, the polyolefin-coke composite granules may be formed such that the characteristic dimension of each granule is within the range of about 50 μm to about 100 μm. Accordingly, including the polyolefin-coke composite granules within the proppant described herein provides a wide degree of flexibility in terms of proppant characteristics.

According to embodiments described herein, the polyolefin-coke composite granules may also include any suitable type(s) of polyolefin polymer chains. Such polyolefin polymer chains may include, for example, polypropylene polymer chains, polyethylene polymer chains (including, for example, highly-crosslinked polyethylene polymer chains such as HDPE), and/or PE wax. In some embodiments, multiple different types of polyolefin polymer chains may also be combined according to embodiments described herein. For example, HDPE/PP blends and/or PE/PP blends may be used.

With respect to the use of PE wax within the polyolefin-coke composite granules, the backbone of PE wax is generally $C_{20}$-$C_{40}$, and it may be as high as $C_{30}$-$C_{60}$ if the PE wax includes some naphthenic content. Moreover, while PE and PE wax share the same backbone chemistry, they differ by molecular weight and, thus, have different physical properties (e.g., different densities and mechanical strengths). In various embodiments, the encapsulation of coke granules within PE wax may provide polyolefin-coke composite granules with preferred proppant transport properties due to the relatively low corresponding composite density. In such embodiments, the polyolefin-coke composite granules may be initially squeezed upon fracture closure, filling the space between the granules. However, the PE wax may then wash away as it is exposed to the temperature and flow conditions within the subsurface region during flowback and initial production, thus leaving the spaces between the granules advantageously open in terms of the ability of hydrocarbon fluids to flow therebetween.

In some embodiments, crosslinked (or highly-crosslinked) polyolefin polymer chains may be used within the polyolefin-coke composite granules described herein. The polyolefin polymer chains may be crosslinked via a number of chemical crosslinks that covalently bond the polyethylene polymer chains to each other. Taking crosslinked polyethylene as an example, crosslinked polyethylene is lightweight, thermally- and chemically-stable, and mechanically strong (e.g. at temperature of 85° C., and under a uniaxial stress of 35 Megapascals, it does not deform more than 10% after 8 weeks of exposure to a typical crude). Moreover, pellets of crosslinked polyethylene can be pulverized into smaller beads that are suitable for use within the polyolefin-coke composite granules described herein.

In some embodiments, the polyolefin polymer chains described herein are formed partially (or entirely) from recycled polyolefin material. As a more specific example, in such embodiments, the polyolefin polymer chains may be formed from recycled PE and/or PP with at least 5 wt % and at most 100 wt % of a post-consumer granular polymeric material.

In some embodiments, the polyolefin polymer chains described herein also include one or more property-modifying fillers. Such property-modifying filler may include any suitable material(s) that may modify one or more properties of the polyolefin polymer chains. Examples of suitable property-modifying fillers include silica, talc, carbon black, glass fiber, and/or metal. Moreover, the modified property (or properties) may include a thermal stability property, a glass transition temperature property, a mechanical hardness property, a mechanical strength property, a chemical reactivity property, and/or a magnetic property of the polyolefin polymer chains.

In some embodiments, upon fluid contact with naturally-occurring liquid hydrocarbons (such as crude oil) within a subsurface region, the polyolefin polymer chains described herein undergo an increase in mass that is less than about 0.05% to about 5% due to absorption of the naturally-occurring liquid hydrocarbons. In addition, in some embodiments, the polyolefin polymer chains described herein have an onset of melting temperature that is within the range of at least 40° ° C. to at least 110° C., as well as a melting temperature that is within the range of at least 60° ° C. to at least 135° C., depending on the details of the specific implementation.

Turning now to details regarding the combination of the petroleum coke granules described herein with the polyolefin polymer chains described herein, any suitable type(s) of petroleum coke granules (as described above) and any suitable type(s) of polyolefin polymer chains (as described above) may be combined in any suitable proportions to form the polyolefin-coke composite granules described herein. For example, in various embodiments, each polyolefin-coke composite granule includes at least 40 wt % and at most 90 wt % of the polyolefin polymer chains and at least 10 wt % and at most 60 wt % of the petroleum coke granule(s). As a more specific example, polyolefin-coke composite granules including about 10 wt % to about 15 wt % petroleum coke granules combined with about 85 wt % to about 90 wt % polyolefin polymer chains may exhibit a density that is close to water, while polyolefin-coke composite granules including about 60 wt % petroleum coke granules combined with about 40 wt % polyolefin polymer chains may exhibit a density within the range of about 1.2 g/cc to about 1.3 g/cc. In particular, a 40-mesh size (420 μm diameter) polyolefin-coke composite granule formed from HDPE or PP combined with a 70-mesh size (210 μm diameter) petroleum coke granule includes 13 wt % coke and a density within the range of about 0.96 g/cc to about 1.03 g/cc. Similarly, a 70-mesh size (210 μm diameter) polyolefin-coke composite granule formed from HDPE/PE combined with an 80-mesh size (177 μm diameter) petroleum coke granule includes 60 wt % coke and a density within the range of about 1.1 g/cc to about 1.35 g/cc.

Accordingly, those skilled in the art will appreciate that the properties of the polyolefin-coke composite granules will vary based on the particular combination of petroleum coke granule(s) and polyolefin polymer chains utilized to form such polyolefin-coke composite granules. In some embodiments, this variability may be utilized to customize the polyolefin-coke composite granules based on the details of the specific implementation. For example, in some embodiments, lab testing may be used to select the type(s) of polyolefin polymer chain(s) that have strong enough bonding with particular type(s) (or sample(s)) of coke to produce a composite granule with sufficient compressive strength to maintain propped fractures under the expected closure stress within the particular subsurface region.

As described herein, the polyolefin-coke composite granules include a number of distinctive properties that render such granules particularly advantageous for use as a light or ultralight proppant for hydraulically fracturing unconventional (or tight) formations. In particular, the polyolefin-coke composite granules described herein have a density with the range of about 0.95 g/cc to about 1.6 g/cc. As described herein, sand typically has a density of around 2.6 g/cc. Accordingly, the density of a proppant formed from the polyolefin-coke composite granules described herein may be at least about 1.5 to about 3.5 times less than the density of conventional, sand-based proppants. In addition, the polyolefin-coke composite granules described herein have an advantageously high crush strength. Specifically, in various embodiments, the polyolefin-coke composite granules are capable of withstanding pressures of up to around 6,000 psi to around 10,000 psi at temperatures of around 180° F. (82° C.) to around 220° F. (104° C.). Furthermore, the polyolefin-coke composite granules provide a number of other advantages, as provided herein. For example, the polyolefin-coke composite granules help to reduce $CO_2$ emissions by providing an alternative use for large quantities of coke that are typically burned as a fuel source.

Exemplary Embodiments of Present Techniques

In one or more embodiments, the present techniques may be susceptible to various modifications and alternative forms, such as the following embodiments as noted in paragraphs 1 to 20:
1. A hydrocarbon well, comprising: a wellbore that extends within a subsurface region; a downhole tubular that extends within the wellbore and defines a tubular conduit; a plurality of perforations formed within the downhole tubular; a plurality of fractures formed within the subsurface region proximate to the perforations; and a proppant positioned within at least a portion of the plurality of fractures, wherein the proppant comprises a plurality of polyolefin-coke composite granules, wherein a characteristic dimension of each polyolefin-coke composite granule is at least 50 micrometers (μm) and at most 3 millimeters (mm), and wherein each polyolefin-coke composite granule comprises: a plurality of polyolefin polymer chains; and at least one petroleum coke granule.

2. The hydrocarbon well of paragraph 1, wherein the hydrocarbon well further comprises a conventional proppant positioned within at least a portion of the plurality of fractures.

3. The hydrocarbon well of paragraph 2, wherein the hydrocarbon well comprises: the conventional proppant preferentially positioned within a first portion of the plurality of fractures; and the proppant comprising the plurality of polyolefin-coke composite granules preferentially positioned within a second portion of the plurality of fractures.

4. The hydrocarbon well of any of paragraphs 1 to 3, wherein the plurality of polyolefin polymer chains within each polyolefin-coke composite granule comprises polypropylene (PP), polyethylene (PE), a blend of PP and PE, or PE wax.

5. The hydrocarbon well of any of paragraphs 1 to 4, wherein the at least one petroleum coke granule within each polyolefin-coke composite granule comprises at least one flexicoke granule, at least one fluid coke granule, or a combination thereof.

6. The hydrocarbon well of any of paragraphs 1 to 5, wherein the plurality of polyolefin polymer chains within each polyolefin-coke composite granule comprises PE wax, and wherein the at least one petroleum coke granule is encapsulated within the PE wax.

7. The hydrocarbon well of any of paragraphs 1 to 6, wherein each polyolefin-coke composite granule comprises: at least 40 weight percent (wt %) and at most 90 wt % of the plurality of polyolefin polymer chains; and at least 10 wt % and at most 60 wt % of the at least one petroleum coke granule.

8. A method of completing a hydrocarbon well, the method comprising: positioning a perforation device within a tubular conduit of a downhole tubular, wherein the downhole tubular extends within a wellbore of the hydrocarbon well, and wherein the wellbore extends within a subsurface region; perforating the downhole tubular using the perforation device to define a plurality of perforations within the downhole tubular; pressurizing the tubular conduit with a pressurizing fluid stream to fracture a plurality of zones of the subsurface region that are proximate to the plurality of perforations, forming a plurality of corresponding fractures within the subsurface region; and flowing a proppant into at least a portion of the plurality of fractures, via the perforations, to prop the fractures with the proppant, wherein the proppant comprises a plurality of polyolefin-coke composite granules, wherein a characteristic dimension of each polyolefin-coke composite granule is at least 50 μm and at most 3 mm, and wherein each polyolefin-coke composite granule comprises: a plurality of polyolefin polymer chains; and at least one petroleum coke granule.

9. The method of paragraph 8, wherein the flowing the proppant into at least the portion of the plurality of fractures comprises flowing the proppant into the fractures within the pressurizing fluid stream.

10. The method of paragraph 8 or 9, further comprising flowing a conventional proppant into at least a portion of the plurality of fractures, via the perforations, to prop the fractures with the conventional proppant.

11. The method of paragraph 10, comprising concurrently flowing the conventional proppant and the proppant comprising the plurality of polyolefin-coke composite granules into at least the portion of the plurality of fractures.

12. The method of paragraph 10, comprising: flowing the conventional proppant into a first portion of the plurality of fractures; and flowing the proppant comprising the plurality of polyolefin-coke composite granules into a second portion of the plurality of fractures.

13. The method of any of paragraphs 8 to 12, wherein the plurality of polyolefin polymer chains within each polyolefin-coke composite granule comprises PP, PE, a blend of PP and PE, or PE wax.

14. The method of any of paragraphs 8 to 13, wherein the at least one petroleum coke granule within each polyolefin-coke composite granule comprises at least one flexicoke granule, at least one fluid coke granule, or a combination thereof.

15. The method of any of paragraphs 8 to 14, wherein the plurality of polyolefin polymer chains within each polyolefin-coke composite granule comprises PE wax, and wherein the at least one petroleum coke granule is encapsulated within the PE wax.

16. A proppant, comprising a plurality of polyolefin-coke composite granules, wherein a characteristic dimension of each polyolefin-coke composite granule is at least 50 μm and at most 3 mm, and wherein each polyolefin-coke composite granule comprises: a plurality of polyolefin polymer chains; and at least one petroleum coke granule.

17. The proppant of paragraph 16, wherein the plurality of polyolefin polymer chains within each polyolefin-coke composite granule comprises PP. PE, a blend of PP and PE, or PE wax.

18. The proppant of paragraph 16 or 17, wherein the at least one petroleum coke granule within each polyolefin-coke composite granule comprises at least one flexicoke granule, at least one fluid coke granule, or a combination thereof.

19. The proppant of any of paragraphs 16 to 18, wherein the plurality of polyolefin polymer chains within each polyolefin-coke composite granule comprises PE wax, and wherein the at least one petroleum coke granule is encapsulated within the PE wax.

20. The proppant of any of paragraphs 16 to 19, wherein each polyolefin-coke composite granule comprises: at least 40 wt % and at most 90 wt % of the plurality of polyolefin polymer chains; and at least 10 wt % and at most 60 wt % of the at least one petroleum coke granule.

While the embodiments described herein are well-calculated to achieve the advantages set forth, it will be appreciated that such embodiments are susceptible to modification, variation, and change without departing from the spirit thereof. In other words, the particular embodiments described herein are illustrative only, as the teachings of the present techniques may be modified and practiced in different but equivalent manners apparent to those skilled in the art having the benefit of the teachings herein. Furthermore, no limitations are intended on the details of formulation, construction, or design herein shown, other than as described in the claims below. Moreover, the systems and methods illustratively disclosed herein may suitably be practiced in the absence of any element that is not specifically disclosed herein and/or any optional element disclosed herein. While compositions and methods are described in terms of "comprising" or "including" various components or steps, the compositions and methods can also "consist essentially of" or "consist of" the various components and steps. Indeed, the present techniques include all alternatives, modifications, and equivalents falling within the true spirit and scope of the appended claims.

What is claimed is:

1. A hydrocarbon well, comprising:
   a wellbore that extends within a subsurface region;
   a downhole tubular that extends within the wellbore and defines a tubular conduit;
   a plurality of perforations formed within the downhole tubular;
   a plurality of fractures formed within the subsurface region proximate to the perforations; and
   a proppant positioned within at least a portion of the plurality of fractures, wherein the proppant comprises a plurality of polyolefin-coke composite granules, wherein a characteristic dimension of each polyolefin-coke composite granule is at least 50 micrometers ($\mu$m) and at most 3 millimeters (mm), and wherein each polyolefin-coke composite granule comprises:
   a plurality of polyolefin polymer chains; and
   at least one petroleum coke granule.

2. The hydrocarbon well of claim 1, wherein the hydrocarbon well further comprises a conventional proppant positioned within at least a portion of the plurality of fractures.

3. The hydrocarbon well of claim 2, wherein the hydrocarbon well comprises:
   the conventional proppant preferentially positioned within a first portion of the plurality of fractures; and
   the proppant comprising the plurality of polyolefin-coke composite granules preferentially positioned within a second portion of the plurality of fractures.

4. The hydrocarbon well of claim 1, wherein the plurality of polyolefin polymer chains within each polyolefin-coke composite granule comprises polypropylene (PP), polyethylene (PE), a blend of PP and PE, or PE wax.

5. The hydrocarbon well of claim 1, wherein the at least one petroleum coke granule within each polyolefin-coke composite granule comprises at least one flexicoke granule, at least one fluid coke granule, or a combination thereof.

6. The hydrocarbon well of claim 1, wherein the plurality of polyolefin polymer chains within each polyolefin-coke composite granule comprises polyethylene (PE) wax, and wherein the at least one petroleum coke granule is encapsulated within the PE wax.

7. The hydrocarbon well of claim 1, wherein each polyolefin-coke composite granule comprises:
   at least 40 weight percent (wt %) and at most 90 wt % of the plurality of polyolefin polymer chains; and
   at least 10 wt % and at most 60 wt % of the at least one petroleum coke granule.

8. A method of completing a hydrocarbon well, the method comprising:
   positioning a perforation device within a tubular conduit of a downhole tubular, wherein the downhole tubular extends within a wellbore of the hydrocarbon well, and wherein the wellbore extends within a subsurface region;
   perforating the downhole tubular using the perforation device to define a plurality of perforations within the downhole tubular;
   pressurizing the tubular conduit with a pressurizing fluid stream to fracture a plurality of zones of the subsurface region that are proximate to the plurality of perforations, forming a plurality of corresponding fractures within the subsurface region; and
   flowing a proppant into at least a portion of the plurality of fractures, via the perforations, to prop the fractures with the proppant, wherein the proppant comprises a plurality of polyolefin-coke composite granules, wherein a characteristic dimension of each polyolefin-coke composite granule is at least 50 micrometers ($\mu$m) and at most 3 millimeters (mm), and wherein each polyolefin-coke composite granule comprises:
   a plurality of polyolefin polymer chains; and
   at least one petroleum coke granule.

9. The method of claim 8, wherein flowing the proppant into at least the portion of the plurality of fractures comprises flowing the proppant into the fractures within the pressurizing fluid stream.

10. The method of claim 8, further comprising flowing a conventional proppant into at least a portion of the plurality of fractures, via the perforations, to prop the fractures with the conventional proppant.

11. The method of claim 10, comprising concurrently flowing the conventional proppant and the proppant comprising the plurality of polyolefin-coke composite granules into at least the portion of the plurality of fractures.

12. The method of claim 10, comprising:
   flowing the conventional proppant into a first portion of the plurality of fractures; and
   flowing the proppant comprising the plurality of polyolefin-coke composite granules into a second portion of the plurality of fractures.

13. The method of claim 8, wherein the plurality of polyolefin polymer chains within each polyolefin-coke composite granule comprises polypropylene (PP), polyethylene (PE), a blend of PP and PE, or PE wax.

14. The method of claim 8, wherein the at least one petroleum coke granule within each polyolefin-coke composite granule comprises at least one flexicoke granule, at least one fluid coke granule, or a combination thereof.

15. The method of claim 8, wherein the plurality of polyolefin polymer chains within each polyolefin-coke composite granule comprises polyethylene (PE) wax, and wherein the at least one petroleum coke granule is encapsulated within the PE wax.

16. A proppant, comprising a plurality of polyolefin-coke composite granules, wherein a characteristic dimension of each polyolefin-coke composite granule is at least 50 micrometers ($\mu$m) and at most 3 millimeters (mm), and wherein each polyolefin-coke composite granule comprises:
   a plurality of polyolefin polymer chains; and
   at least one petroleum coke granule.

17. The proppant of claim 16, wherein the plurality of polyolefin polymer chains within each polyolefin-coke composite granule comprises polypropylene (PP), polyethylene (PE), a blend of PP and PE, or PE wax.

18. The proppant of claim 16, wherein the at least one petroleum coke granule within each polyolefin-coke composite granule comprises at least one flexicoke granule, at least one fluid coke granule, or a combination thereof.

19. The proppant of claim 16, wherein the plurality of polyolefin polymer chains within each polyolefin-coke composite granule comprises polyethylene (PE) wax, and wherein the at least one petroleum coke granule is encapsulated within the PE wax.

20. The proppant of claim 16, wherein each polyolefin-coke composite granule comprises:
at least 40 weight percent (wt %) and at most 90 wt % of the plurality of polyolefin polymer chains; and
at least 10 wt % and at most 60 wt % of the at least one petroleum coke granule.

* * * * *